Figure 3:
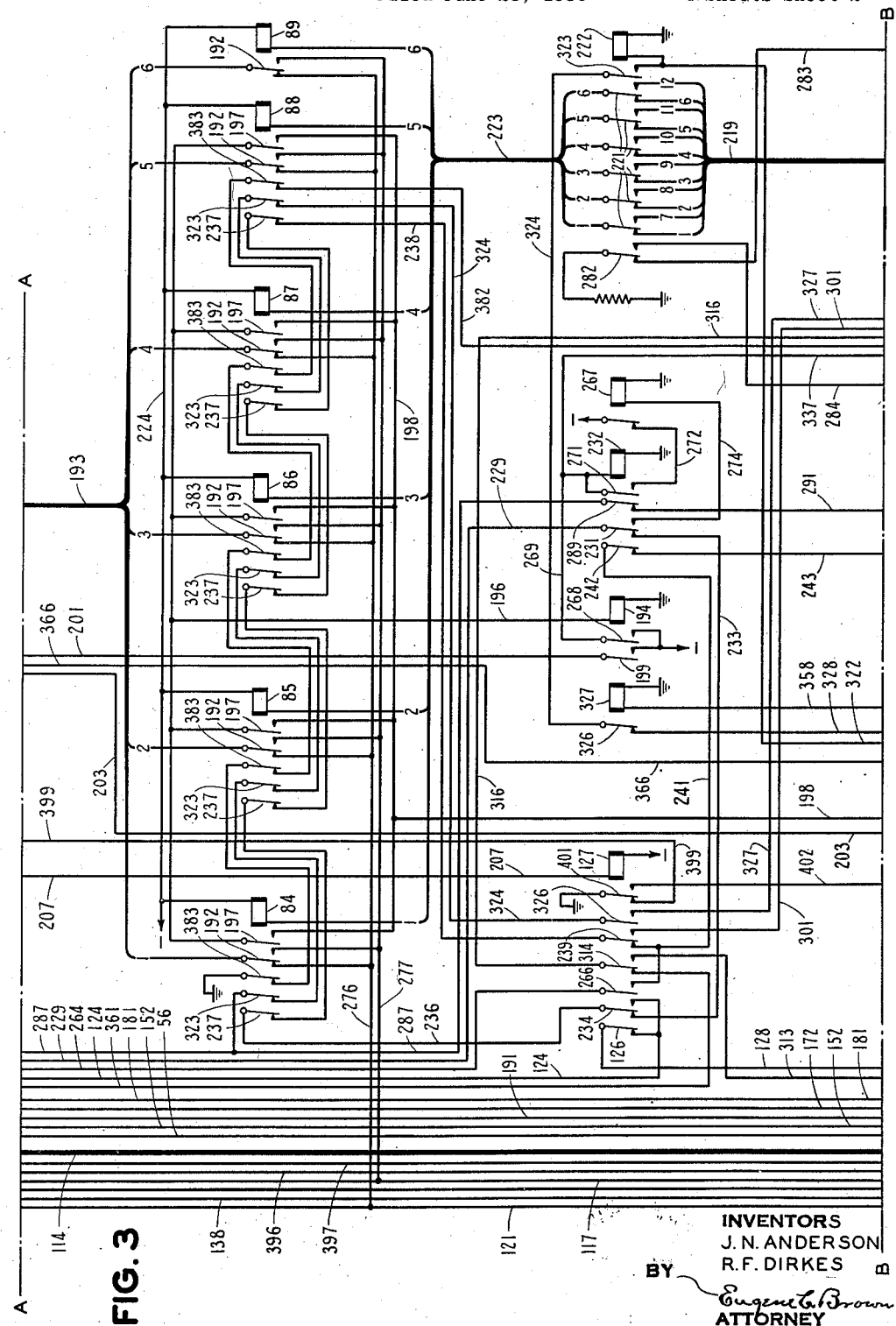
Figure 4:
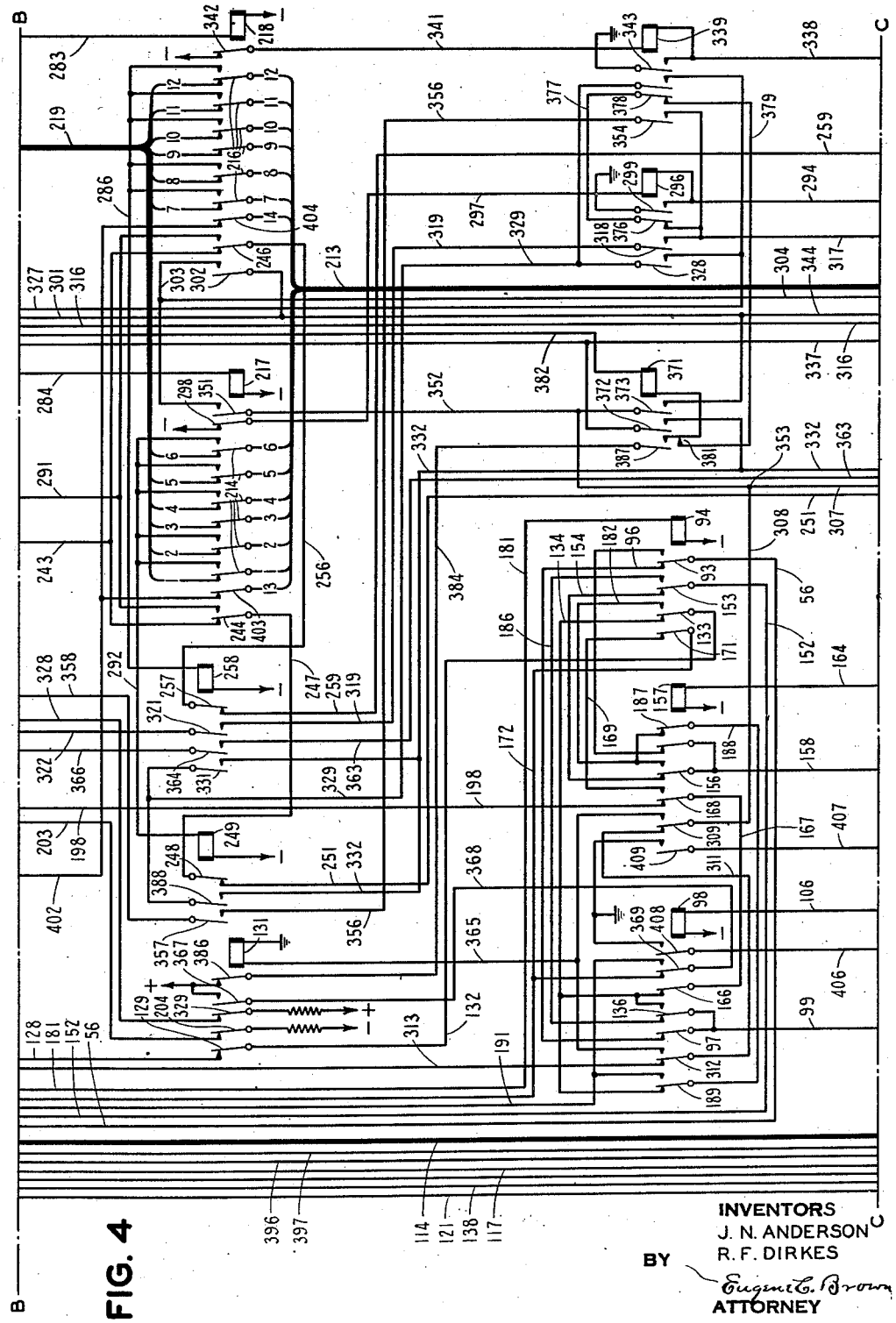

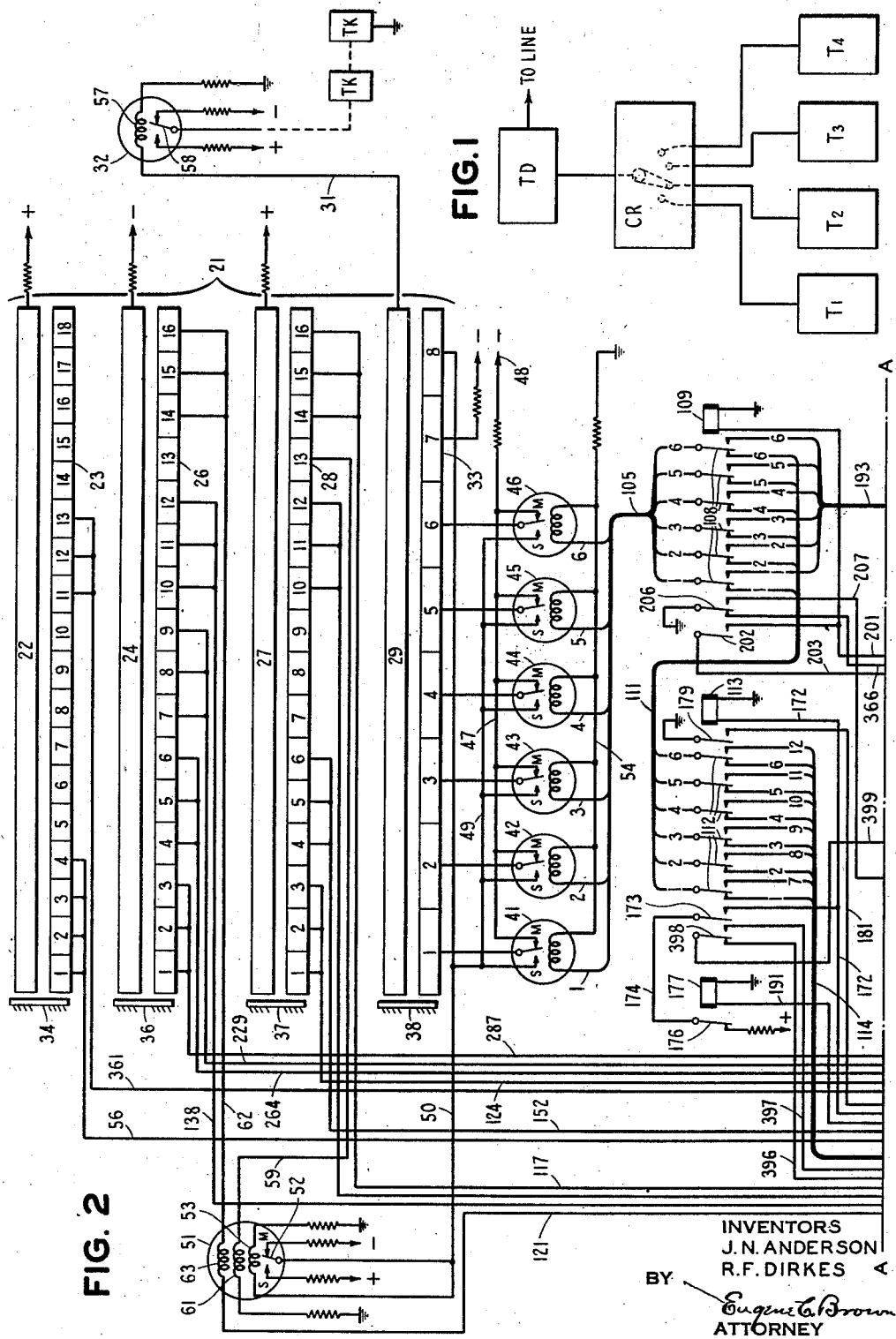

Sept. 12, 1939. J. N. ANDERSON ET AL 2,172,920

TELEGRAPH SYSTEM

Filed June 26, 1936  4 Sheets-Sheet 2

INVENTORS
J. N. ANDERSON
R. F. DIRKES
BY Eugene C. Brown
ATTORNEY

Sept. 12, 1939.   J. N. ANDERSON ET AL   2,172,920
TELEGRAPH SYSTEM
Filed June 26, 1936   4 Sheets-Sheet 4

INVENTORS
J. N. ANDERSON
R. F. DIRKES
BY Eugene C. Brown
ATTORNEY

Patented Sept. 12, 1939

2,172,920

UNITED STATES PATENT OFFICE 2,172,920

TELEGRAPH SYSTEM

James N. Anderson, North Plainfield, N. J., and Robert F. Dirkes, Jamaica, N. Y., assignors to The Western Union Telegraph Company, New York, N. Y., a corporation of New York Application June 26, 1936, Serial No. 87,570

55 Claims. (Cl. 178—52)

This invention relates to a telegraph transmission system and more particularly to a printing telegraph system for disseminating stock, bond, commodity and like quotations to one or more remote stations.

In printing telegraph systems for the dissemination of market quotations and financial news, it is the usual practice to use a separate network and system for each separate service.

As is familiar to those acquainted with the dissemination of market news, particularly stock, bond and like quotations, the demand on the telegraph system used varies between comparatively wide limits; the demand depending directly on the activity of the particular market. The activity of the market in this case means the volume of trading or the number of separate sales per unit of time, and not the price fluctuations of the particular commodities. However, during active markets the price of a commodity is likely to fluctuate rapidly and consequently it is desirous that the subscribers to the service or the brokers receive the quotations as soon as possible. With this requisite in mind the operating speed of the telegraph systems used for the dissemination of the market news is designed to approach as nearly as possible the maximum demand on the system. As the systems are designed for maximum demand in their respective service, there is considerable time during "slow" or "average" markets when the systems are idle.

In less active exchanges, such as the Chicago Grain and the New York Cotton, as compared with the New York Stock Exchange, where the demand on the disseminating system used in conjunction therewith does not approach the capacity thereof, the system is idle a greater part of the time. Thus with a separate telegraph system associated with each exchange a great deal of equipment is required which is not efficiently used.

In accordance with the above stated conditions, one of the objects of this invention is to establish a telegraph disseminating system wherein the quotations or news from a plurality of less active exchanges may be disseminated over one telegraph system. The advantages of such a system are apparent in that one system replaces a plurality of systems requiring fewer attendants and less equipment, especially receiving units.

Another object is to provide a storage system whereby the quotations of a plurality of exchanges may be stored in separate storing units and subsequently transmitted to a single telegraph disseminating system in a predetermined preferential order.

More specifically, an object of the invention, with reference to the quotation storage system referred to above, is to provide a control for the storage units whereby the signals stored in predetermined of said storage units have preference to the disseminating system over those stored in others of said storage units. That is, with signals stored in each unit, the signals from predetermined of said units will be transmitted before those in the other units.

In the embodiment of this invention which will be hereinafter described in detail, it is proposed to employ four signal storage units. In this embodiment two of these storage units are metallic storing transmitters of the type disclosed in U. S. patent to Wheeler No. 1,576,167, dated May 9, 1925. The other two storage units are tape transmitters of the general type disclosed in U. S. patent to Benjamin No. 1,298,440, dated March 25, 1919. It should be kept in mind, however, that the invention is not limited to these particular arrangements of storing units, other types and arrangements being readily applicable. A transmitting distributor is used to distribute the signals from the storing units to a line and also provide local impulses which time the action and operate various relays.

As the four storing units transmit into only one channel of the transmitting distributor, a plurality of control relays are provided to direct the signals from the various storage units to the transmitting distributor in a predetermined order. These relays are neutral relays with various contact arrangements, each contact arrangement being built up according to the function for which it is designed. The various relays are operated by various methods. Some relays operate by a single impulse of current which is supplied from local rings of the distributor. These relays may be locked in an operated condition by having a steady current supplied to their coils through one of their own contacts, in which case, means usually comprising another relay is required to unlock or break the circuit through their coils. Other relays are operated by having battery or ground applied to their coils from other parts of the system, completing circuits which remain closed until the battery or ground is removed by the changing conditions in the system. The method by which each relay is operated will be hereinafter described as the circuits therefor are described.

The storage units are divided into two groups, viz., preferred and deferred, and the control relays are so arranged that the signals stored in the preferred units will be transmitted before those stored in the deferred units. The preferred and deferred storage groups are further divided into first and second storage units. The first preferred storage unit is first in order of selection and will always be given first chance to transmit to the sending circuit. The second preferred is second in order of selection and the deferred units are third in order of selection. Usually the first deferred unit is the first selected of the deferred units but by manually operating a key, the subsequent choice of the deferred units is reversed. In each case the choice depends on whether there are combinations stored in the storage unit to be selected. A storage unit void of stored combinations automatically loses its preferred position in selection and the unit of the highest order of selection with stored combinations will always be chosen first at the transfers.

These and other features will be pointed out and a better understanding thereof may be had from the following detailed description in conjunction with the drawings which describe and show one specific embodiment of the invention. In the drawings:

Fig. 1 diagrammatically illustrates the arrangements of the storage units, the control means and the transmitting distributor, and Figs. 2, 3, 4 and 5 show the detail electrical circuits of the complete system.

Referring now to Fig 1, the four above mentioned transmitters are represented at T1, T2, T3 and T4, and will be hereinafter referred to as such. The transmitters are shown connected to the control means represented as CR which in turn is connected to the transmitting distributor TD. The control means comprise a plurality of relays by means of which the transmitters are connected one at a time to the transmitting distributor in a predetermined manner from whence the signals are transmitted to the line.

Distributor operation

Referring now to Figs. 2 to 5, the operation of the transmitting distributor will first be given. The distributor is adapted to transmit to a dissemination system which employs start-stop receiving units TK, for example of the form known in the art as 5-A tickers. The construction of this ticker is fully disclosed in U. S. patent to Morton, No. 1,821,110, dated Sept. 1, 1931. The signals which control the tickers must be of the start-stop variety, i. e., in which each character code group is preceded by a starting impulse and followed by a rest impulse. As the recording units are of the start-stop type, requiring starting and stopping impulses, and the distributor is of the constantly rotating type, means is preferably provided whereby the tickers will not be started and stopped for every revolution of the distributor when there are no character code groups to be transmitted. For this condition a continuous impulse of the same character as the rest impulse is transmitted to the line.

· In the drawings the distributor is indicated by reference numeral 21 and has four sets of rings. The first set comprises a solid ring 22 which is connected to positive potential and a segmented ring 23 with segments numbered 1 to 18. The second set of rings comprises a solid ring 24 to which is connected negative potential and a segmented ring 26 having segments numbered 1 to 16. The solid ring 27 of the third set is connected to positive potential and the segmented ring 28 has segments numbered 1 to 16. The fourth set of rings comprises a solid ring 29 which is connected by a conductor 31 to a polarized transmitting relay 32, and a segmented ring 33 having segments numbered 1 to 8. Each of the four sets of rings has an associated brush 34, 36, 37 and 38 which successively bridge the segments of the segmented rings with their associated solid rings as the distributor rotates; the brushes traveling in unison. The segments of the four segmented rings are connected, as will be hereinafter described, to various elements of the system.

The manner of transmitting a blank character to the line will now be described. These are the characters that are transmitted when there are no character code groups representing letters, figures, etc. to be transmitted, and for the blank characters the six variable impulses of the signaling code are all spacing. As mentioned, it is desirable when these blank characters are being transmitted by the distributor to prevent the receiving tickers from starting and stopping for each blank character. This is done by changing the spacing start impulse and the six selecting impulses of such signals to marking impulses. Thus for such signals a continuous marking impulse is transmitted and the manner and equipment by which this is done will now be described.

A group of six polarized transmitting relays 41 to 46 have the tongues thereof connected to respective segments 1 to 6 of the segmented ring 33. The marking or right hand contacts of the relays are connected in parallel by a conductor 47 to negative potential at 48. The left hand or spacing contacts of the relays 41 to 46 are connected in parallel by conductors 49 and 50 of the eighth segment of ring 33 and to the tongue 52 of a cut-off relay 51. The tongue 52 is also connected to a coil 53 of the relay 51, the other side of which is grounded. One side of the coils of relays 41 to 46 are grounded by a conductor 54. The other sides of the coils of relays 41 to 46 are connected through various switching elements, the exact arrangement of which will be hereinafter described, to a set of code selecting contacts. For this part of the explanation it is only necessary to assume that these contacts are capable of being operated in combinations representative of the character code groups to be transmitted and thereby apply combinations of positive and negative current to the coils of the polarized relays 41 to 46. For a blank character the code selecting contacts cause the tongues of the relays 41 to 46 to be on their spacing or left hand contacts.

Assume that the brushes 34, 36, 37 and 38 are beginning to bridge the solid rings with the first segments of their associated segmented rings 23, 26, 28 and 33, respectively. Only those circuits completed by the brushes which have reference to the transmission of characters will now be described, the other circuits being described later. As the brush 34 contacts segments 1, 2, 3 and 4 of ring 23, positive potential is applied over conductor 56 to a means for changing the selection of the code selecting contacts, to ground; the specific arrangement and circuit therefor will be described later. This will cause the code selecting contacts to be set in accordance with the assumed character which is a blank. This character, however, is not immediately transferred to the transmitting relays 41 to 46. The relays 41 to 46 will remain set according to the previous character group and as the brush 38 contacts segments 1 to 6 of ring 33, a combination of impulses representative of the settings of the tongues of the relays will pass through the coil 57 of the transmitting relay 32 to ground. These impulses cause the tongue 58 of relay 32 to vibrate in accordance therewith, and connect negative and positive potentials thereto, the impulse being transmitted over the line to the receiving units or tickers TK. As the brush 37 reaches segment 13 of ring 28, a circuit is completed therefrom over a conductor 59, and through a coil 61 of the cut-off relay 51 to ground. This causes the tongue 52 to move to its marking contact which applies marking battery over conductor 50 to segment 8 of ring 33 and as the brush 38 subsequently contacts this segment, a marking impulse is transmitted which adds to the length of the marking rest impulse transmitted from segment 7. If the next character had been any other than a blank, the tongue 52 of relay 51 would have been moved to its spacing contact, as will be hereinafter described, before the brush 38 reached segment 8 of ring 33. This would cause a spacing start impulse to be transmitted instead of continuing the marking rest impulse. Segment 7 of ring 33 is permanently connected to negative or marking potential. For the blank character the tongue 52 also applies marking battery to the spacing stops of the relays 41 to 46 which in turn are connected through the tongues of the relays to segments 1 to 6 of ring 33. The tongues of relays 41 to 46 are set in accordance with the position of the code selecting contacts when the brushes 36 and 37 contact segments 14, 15 and 16 of rings 26 and 28, respectively, as will be hereinafter described. Therefore, as the brush 38 subsequently contacts segments 1 to 6 on the next revolution thereof, negative potential will be transmitted to the relay 32. As described, negative impulses are transmitted when the brush 38 contacts segments 7 and 8, and therefore a continuous flow of negative potential is transmitted for following revolutions of the brush which continues until a character other than a blank is set up in the code selecting contacts.

The operation of the distributor will now be described on the transmission of a character other than a blank. Assume that the positive impulses from segments 1 to 4 of ring 23 cause a character code to be set up in the code selecting contacts. This code will be transferred to the polar relays 41 to 46, as will be hereinafter described, when the brushes 36 and 37 contact segments 14, 15 and 16 of rings 26 and 28 respectively. The circuit from segments 14, 15 and 16 of ring 26 passes over conductor 62 and through a coil 63 of the cut-off relay 51. This causes the tongue 52 to contact its spacing contact and in so doing applies spacing potential to segment 8 of ring 33 and to the spacing contacts of the relays 41 to 46. Now, when the brush 38 reaches segment 8 of ring 33, a spacing impulse will be transmitted which is the start impulse. The spacing and marking contacts of the relays 41 to 46 now have respective potentials connected thereto and the tongues are selectively set and are connected to segments 1 to 6 of ring 33. Therefore, on the next passage of the brush 38 over segments 1 to 6 a combination of impulses representative of the setting of the tongues of relays 41 to 46 will be transmitted. As the brush 38 subsequently reaches segment 7 of ring 33, a marking rest impulse is transmitted and concomitantly the brush 37 contacts segment 13 of ring 28 and as described causes the tongue 52 of relay 51 to move to its marking contact and apply marking battery to segment 8 of ring 33 and to the spacing stops of the relays 41 to 46. However, before the brush 38 reaches segment 8 of ring 33, brush 36 contacts segment 14 of ring 26 and, as heretofore described, when other than blanks are to be transmitted, a circuit is completed through the coil 63 of relay 51, causing its tongue to move to its spacing contact. Therefore, another starting impulse is transmitted from segment 8 of ring 33 for the next character, provided the character set up in the code selecting contacts is not a blank.

Thus it can readily be seen that the function of the cut-off relay is to prevent the sending of a spacing start impulse and other spacing impulses when there are blanks or no characters set up in the code selecting contacts. Therefore, a steady marking impulse is maintained on the line during the period between characters. When the tongue of relay 51 is on either of its contacts, a locking circuit is completed through the coil 53 to hold the tongue in its last operated position.

The setting up and transferring of code combinations from the code selecting contacts to the transmitting relays 41 to 46 is the basic operation involved in transmitting to the line. In this system there are a plurality of sets of code selecting contacts. The other operations consist of setting up the various sets of code selecting contacts and then choosing and connecting the set of selecting contacts from which it is desired to transmit to the transmitting relays.

In this system three sets of the so-called code selecting contacts are employed. Each contact of each set is controlled by an individual selecting relay. The relays of the first code selecting contact set are controlled by the transmitter T1, the second set by transmitter T2 and the third set by transmitters T3 and T4.

*Selecting relays of transmitter T1*

Figure 5:
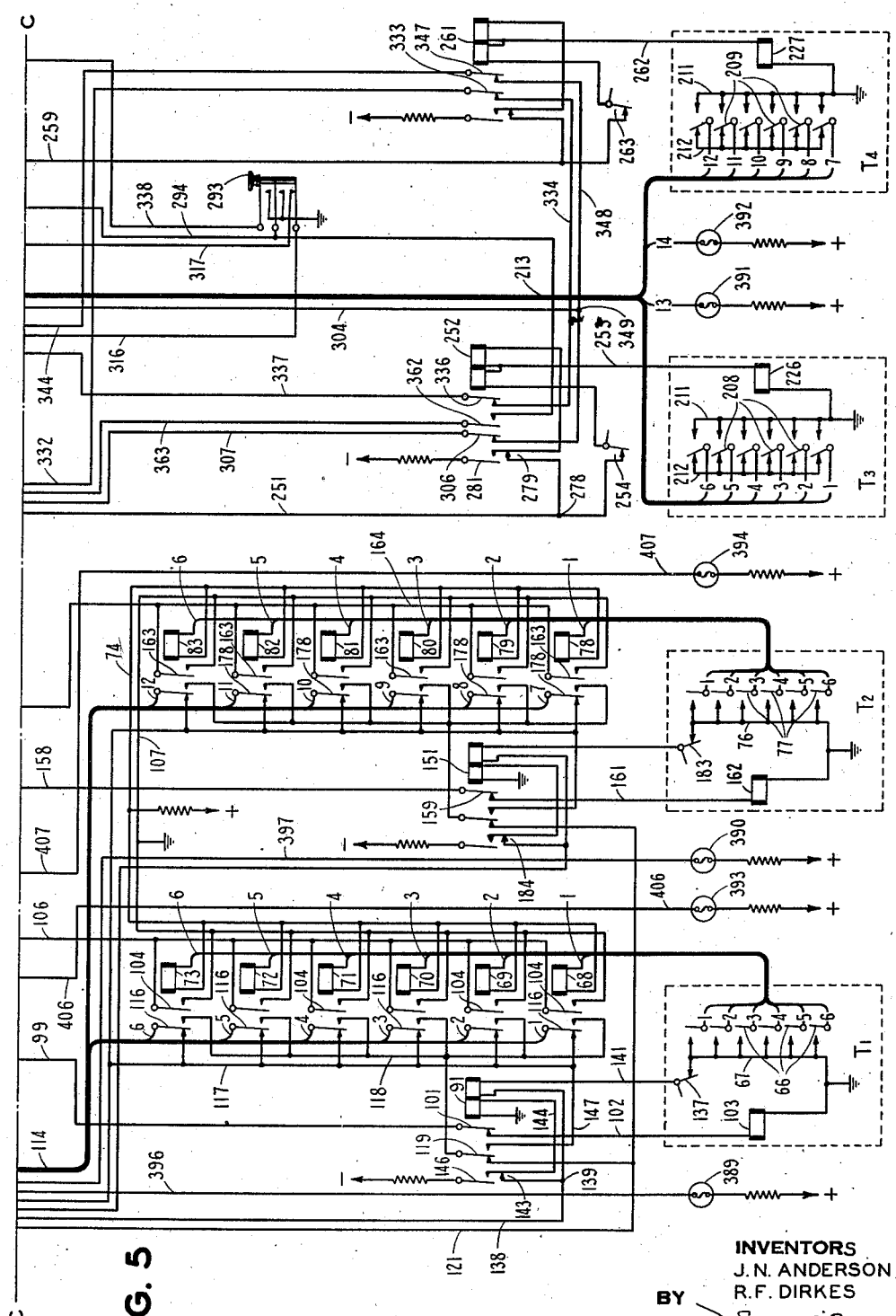

Referring now to Fig. 5, the first transmitter represented at T1 is a metallic storage transmitter, for example of the type disclosed in the above mentioned Wheeler patent. A full description of the operation of this transmitter is not necessary as various suitable storing transmitters are well known in the art, it being sufficient to say that code combinations of signals are adapted to be stored therein and subsequently transmitted therefrom as will be hereinafter described.

A set of tongues 66 on the transmitting arm of the transmitter T1 are adapted to make contact with a grounded bus bar 67 in combinations representative of the character codes to be transmitted from the transmitter. As is well known, these tongues 66 are operated by groups of selectively positioned pins in the storing transmitter drum, each group of pins being set in combinations representative of the character codes stored therein by some means such as a keyboard. Each tongue of transmitter T1 is connected to one of the individual associated neutral relays 68 to 73. The other sides of the relay coils are connected in parallel by a conductor 74 to battery. Thus the relays 68 to 73 will be operated or remain in their normal position according to the code group set up in the transmitter T1 associated with the current position of the transmitting arm. The relays 68 to 73 comprise what is known as the selecting relays of transmitter T1 and functions performed by these relays will be described later. These relays are neutral relays and are similar to other relays to be hereinafter mentioned with a plurality of movable tongues. The tongues of each relay are adapted to move simultaneously when the relay is energized, breaking away from their respective so-called break contacts and making contact with their so-called make contacts. Some tongues have only a break or make contact associated therewith while others have both.

Selecting relays of transmitter T2

The second transmitter T2 is similar to transmitter T1 and has a grounded bus bar 76 and a set of movable tongues 77 which are connected to the coils of individual associated relays 78 to 83. The other sides of the relay coils are also connected by the conductor 74 to battery. Therefore, these relays will likewise be operated or remain in their normal position according to the position of their associated tongue in transmitter T2. The relays 78 to 83 comprise the selecting relays of the transmitter T2.

Selecting relays of transmitters T3 and T4

A set of six neutral relays 84 to 89, Fig. 3, comprises what is known as the selecting relays of the two tape transmitters T3 and T4. These transmitters are controlled in the usual manner by a tape but a special switching arrangement has been provided for choosing the transmitter which is to set up the code combinations in the selecting relays 84 to 89. A description of the manner in which this choice of tape transmitters is made will be included later in the description as it is associated with other operations and will be more clearly understood after having described this operation first.

Operation of transmitter T1

The three sets of selecting relays 68 to 73, 78 to 83 and 84 to 89 have been identified and the manner in which each group is chosen and allowed to transfer its code combinations to the above mentioned transmitting relays 41 to 46 will be described.

It will be assumed that the system is just being started and that none of the neutral relays is operated, with exceptions hereinafter mentioned. It will also be assumed that the transmitting distributor is transmitting a continuous marking rest impulse as hereinbefore described by means of the cut-off relay 51. Further assume that nothing but blanks are stored in the transmitters T1 to T4 and that the impulses for operating the transmitters are being cut off as will be hereinafter described in conjunction with the auto-stop operation. With blanks in the transmitters none of the code selecting relays will be operated.

Let it be supposed that transmitter T1 subsequently has some character code combinations stored therein. Due to the construction of the storing transmitter T1, the transmitting arm is two characters behind the setting-up arm and means must be provided to step the transmitting arm ahead to pick up the stored character groups. A further means must then be provided whereby hereinafter described switching relays can switch the contacts of the associated code selecting relays 68 to 73 to the transmitting relays 41 to 46.

As the character groups are stored in the transmitter T1, the setting-up arm is stepped ahead and the auto-stop mechanism is restored to normal (this mechanism will be described later). With the auto-stop mechanism in its normal condition the relay 91 is deenergized. After the restoration of the auto-stop mechanism to normal, the next passage of the brush 34 over segments 1 to 4 of ring 23 completes a circuit from battery at the solid ring 22, over the brush 34, through segments 1 to 4 of ring 23, over conductor 56, through the tongue 93 and break contract of a relay 94, over conductor 96, through the break contact and tongue 97 of a relay 98, continuing over conductor 99, through the tongue 101 and break stop of relay 91, over conductor 102 and through the coil of transmitting arm operating magnet 103 of the storing transmitter T1 to ground. Under the assumed conditions the brush 34 will complete the above circuit for every revolution thereof and advance the transmitting arm one step for each revolution, the cut-off relay 51 meanwhile continuing its transmission of a marking rest impulse.

The second step of the transmitting arm causes selected pins in the storing transmitter to be engaged and thereby operates associated tongues 66 to make contact with the grounded bus bar 67 in combinations representative of the first character group stored in transmitter T1. The operated tongues complete circuits from the grounded bus bar 67 through the coils of their associated code selecting relays 68 to 73 to battery and thus one or more of the relays are operated in a combination representative of the first setting of the pins in the transmitting drum. Tongues 104 of relays 68 to 73 are connected in parallel by a conductor 106 and through the coil of a relay 98 to battery. Associated make contacts of the tongues 104 are connected in parallel by conductor 107 to ground. Thus as any one of the selecting relays 68 to 73 is operated, the circuit to relay 98 is completed which operates the same. The function of relay 98 will be hereinafter described.

As the brushes 36 and 37 contact segments 14, 15 and 16 of their associated rings 26 and 28 subsequent to the operation of the selecting relays 68 to 73, the combination set therein is transferred to the transmitting relays 41 to 46. One side of each coil of the transmitting relays 41 to 46 is grounded by conductor 54 and the other side is connected by individual conductors of a cable 105 to associated tongues 108 of a relay 109. The break contacts associated with the tongues 108 are connected by a cable 111 to respective associated tongues 112 of a relay 113. The break contacts of relay 113 associated with the tongues 112 are connected by a cable 114 to respective tongues 116 of the selecting relays 68 to 73. The break contacts of relays 68 to 73 associated with the tongues 116 are connected in parallel by a conductor 117 to segments 14, 15 and 16 of the ring 28. The make contacts associated with the tongues 116 are connected in parallel by a conductor 118, through a tongue 119 and break contact of relay 91, over a conductor 121, through the coil 63 of the cut-off relay 51 and over conductor 62 to segments 14, 15 and 16 of ring 26. Thus, as the brushes 36 and 37 contact segments 14, 15 and 16 of rings 26 and 28, marking and spacing potential is applied to the make and break contacts respectively associated with the tongues 116 of relays 68 to 73. The tongues of the relays 68 to 73 are set in a combination representative of the setting of the tongues 66 of the transmitter T1 and therefore marking and spacing potential will be applied over the above described circuits to the coils of the transmitting relays 41 to 46 to operate the same in a similar combination. The transmitting relays 41 to 46 in turn, subsequently apply a similar combination of marking and spacing potentials to segments 1 to 6 of the ring 33 as hereinafter described.

One or more of the tongues 116 of relays 68 to 73 will be operated to its marking contact because the combination is not a blank and therefore as the brush 36 contacts segments 14, 15 and 16 of ring 26, negative battery is applied through the coil 63 of the cut-off relay 51 to ground through the above described circuits including the coil of one or more of the transmitting relays 41 to 46. This marking impulse moves the tongue of relay 51 to its spacing contact which in turn applies positive potential to segment 8 to ring 33 and to the spacing contacts of the transmitting relays 41 to 46. Therefore, when the brush 38 subsequently contacts segment 8 of ring 33, a spacing start impulse will be transmitted to the line as hereinbefore described. The tongues of the transmitting relays 41 to 46 being operated in accordance with the code combination apply spacing and marking potentials from respective contacts thereof to respective segments 1 to 6 of the ring 33. On the next passage of the brush 38 over these segments a corresponding character code will be transmitted to the line followed by a marking rest impulse from segment 7. Thus the first combination set up in the pins in the storing transmitter T1 is transmitted to the line and this transmitter is in control of the circuits.

Up to this point the stepping impulses for the operating magnet 103 of the transmitter T1 were derived from segments 1 to 4 of ring 23 and passed through the armature 93 and break contact of relay 94, the tongue 97 and break contact of relay 98, conductor 99 and the armature 101 and break contact of relay 91. It will be remembered that relay 98 was operated when one or more of the selecting relays 68 to 73 are energized and therefore this circuit to the operating magnet 103 is broken. However, the operation of relay 98 completes another circuit to the operating magnet 103 in conjunction with the brush 37. This circuit is from positive battery at ring 27, over brush 37, through the segments 1 to 3 of ring 28, over a conductor 124, through the break contact and associated tongue 126 of a relay 127, over a conductor 128, through break contact and associated tongue 129 of a relay 131, continuing over a conductor 132, through the tongue 133 and break contact of relay 94, over conductor 134 and through the make contact and associated tongue 136 of relay 98 to the conductor 99. The circuit from here on to the operating magnet 103 has been described. Thus after the operation of relay 98 operating impulses for the magnet 103 come from the segments 1 to 3 of ring 28. This renders the impulses from the segments 1 to 4 of ring 23 available for other operations as will be described.

*Auto-stop operation*

As is well known to those versed in the art, the auto-stop on a storing transmitter is a mechanism which breaks the circuit to the transmitting arm operating magnet when said arm approaches within a predetermined number of combinations of the setting-up arm. Assume that after the transmission of a plurality of combinations the transmitting arm approaches the setting-up arm. Unless some means were provided for stopping the transmitting arm, the two arms would jam and cause trouble. Therefore, when the transmitting arm approaches within two combinations of the setting-up arm, an auto-stop contact 137 on transmitter T1 is mechanically opened. This occurs concomitantly with passage of the brush 37 over segments 1, 2 and 3 of ring 28. The brush 36 subsequently contacts segments 10, 11 and 12 of ring 26 and an impulse is sent therefrom over a conductor 138 to a point 139. With the auto-stop contact closed, the impulse from segments 10, 11 and 12 of ring 28 divides at point 139; half going through the right hand coil of relay 91, over conductor 141 and through the auto-stop contact 137 to the grounded bus bar 67, the other half going through the make-before-break contacts 143 of relay 91, over conductor 144 and through the left hand coil of relay 91 to ground. The two coils of relay 91 are opposed and therefore with contact 137 closed, the relay will not be operated by the above impulses. However, when the auto-stop contact 137 is open, the right hand coil is open-circuited and thus the current in the left hand coil will operate the relay 91. As the relay 91 operates, the make-before-break contact 143 opens the circuit from segments 10, 11 and 12 of ring 26 to the left hand coil of relay 91 and applies negative potential over the tongue 146 of the make-before-break contact 143, over conductor 144, causing the relay to become locked in its operated position. When the tongue 101 of relay 91 is operated, it opens the circuit to the operating magnet 103 of the transmitting arm. Thus, further impulses to the operating magnet 103 are cut off as long as the relay 91 remains operated which prevents the transmitting arm from advancing. However, the combination which is stored in the drum at the position where the transmitting arm is halted will still be effective on the tongues 66. They in turn are still effective on the code selecting relays 68 to 73 and unless some means is provided to prevent it, this combination will be repeated over and over each time the brush 38 passes over the segments 1 to 6 of ring 33 as this combination is transferred to the transmitting relays 41 to 46 every time the brushes 36 and 37 contact the segments 14, 15 and 16 of rings 26 and 28. As described above, the circuit to the make contacts associated with the tongues 116 of relays 68 to 73 passed through the tongue 119 and break contact of relay 91. Through these make contacts marking potential was supplied to the transmitting relays 41 to 46 in combinations representative of the operated relays as the brush 36 contacted segments 14, 15 and 16 of ring 26. When the relay 91 is operated, however, the circuit supplying marking potential to these make contacts is opened and said make contacts are connected through the tongue 119 and make contact of relay 91 and over a conductor 147 to the conductor 117. Now, when the brush 37 contacts segments 14, 15 and 16 of ring 28, spacing potential is applied to both the make and break contacts of relays 68 to 73 associated with tongues 116 and therefore all the transmitting relays 41 to 46 will be operated to set up a combination consisting only of spacing impulses. As the circuit from segments 14, 15 and 16 of ring 26 through the cut-off relay 51 is opened at the break contact associated with the tongue 119 of relay 91, the cut-off relay will not be operated to spacing, and as described will cause a marking rest impulse to be transmitted as the brush 38 contacts segment 8 of ring 33. The rest impulse is continued throughout subsequent revolutions of the brush 38 as hereinbefore described until the cut-off relay 51 is operated to spacing. Thus the combination which is stored in the selecting relays 68 to 73 will not be transmitted, but will remain stored until the setting-up arm of transmitter T1 moves ahead and allows the auto-stop contact 137 to close.

When the auto-stop contact 137 eventually closes the relay 91 will remain operated until the brush 36 contacts segments 10, 11 and 12 of ring 26, which supplies a negative impulse over conductor 138, through the right hand coil of relay 91, over conductor 141 and through the auto-stop contact 137 to ground. This time this impulse will pass only through the right hand coil of relay 91 because the circuit to the left hand coil is open at the make-before-break contact 143. This impulse passing through the right hand coil of relay 91 will neutralize the effect of the locking circuit through the left hand coil, releasing the armatures and allowing the relay to return to normal. Now, when the brushes 36 and 37 reach segments 14, 15 and 16 of rings 26 and 28, transmission will again be resumed as the system is restored to the condition described in conjunction with the transmission of the first combination and the next combination to be transmitted will be the one that was stored in the selecting relays 68 to 73.

*Transferring from transmitter T1 to T2*

Up to this point it has been assumed that transmitter T1 is the only transmitter which has had any character combinations stored therein. However, while the combinatons in transmitter T1 were being transmitted, the other transmitters may have had combinations stored therein and let it be assumed that transmitter T2 has combinations stored in its drum, these combinations being stored while transmitter T1 had control of the circuits and was transmitting to the line.

As the setting-up arm of transmitter T2 advances, the auto-stop mechanism is restored to normal. This auto-stop mechanism is substantially the same as that of transmitter T1 and its operation will be described later. With the auto-stop in its normal unoperated condition, the relay 151 will be unoperated and a circuit will be completed from segments 4, 5 and 6 of ring 28, over a conductor 152, through the tongue 153 and break contact of relay 94, over a conductor 154, through the break contact and tongue 156 of a relay 157, over a conductor 158, through the tongue 159 and break contact of relay 151, over conductor 161 and through the coil of the transmitting arm operating magnet 162 to ground. Therefore, for these conditions as the brush 37 contacts these segments an impulse will be received by the magnet 162 causing it to advance the transmitting arm one step for each revolution of the brush. On the second step of the transmitting arm the tongues 77 of transmitter T2 will be operated in a combination representative of the first combination stored in the drum. This combination will in turn be transmitted to the associated code selecting relays 78 to 83, as one side of each of the relays are connected by conductor 74 to battery and the other sides are connected to ground at the bus bar 76 through individual circuits completed by the respective tongues 77 when operated. A tongue 163 of each of the relays 78 to 83 is connected in parallel by a conductor 164 through the coil of relay 157 to battery. The associated make contacts of tongues 163 are connected in parallel by conductor 107 to ground. Therefore, as one or more of the relays 78 to 83 are operated, the circuit to relay 157 is completed which operates the same. This condition is established when the transmitting arm engages the first set of selected pins in the drum of transmitter T2. With relay 157 operated, the circuit from segments 4, 5 and 6 of ring 28 to the transmitting arm operating magnet 162 is opened at the tongue 156 of relay 157 and following passages of the brush 37 over these segments will not advance the transmitting arm. Thus the transmitting arm of transmitter T2 remains engaged with the first set of selected pins in the drum and is now prepared to take control of the circuits at the next opportunity offered by the transmitter T1 as will be described.

Each group or plurality of groups of combinations in each storing unit are separated by one or more blanks, usually several blanks, when a substantial length of time elapses between the setting up of these groups. More specifically, after setting up combinations in the storing transmitters, if there are no more combinations to be immediately set up, a series of blanks are set up in the drum. In the tape used with the tape transmitter these blanks take the form of tape steppers or blanks in the tape. These may be inserted between the groups automatically or manually and their purpose is to insure that all the stored combinations will be transmitted before the associated auto-stop devices stop the advancement of the transmitting arms or tape in the storing and tape transmitters respectively for a prolonged period of time. The occurrence of a blank character in transmitter T1 renders transmitter T2 operative.

Assume that there are no more combinations in transmitter T1 and that the transmitting arm is associated with one of the above mentioned blanks. As described, this condition returns all of the code selecting relays 68 to 73 to normal and consequently releases the relay 98 allowing it also to return to its normal unoperated position. When this occurs, the circuits are ready to be switched to the transmitter T2. Assuming that the time required for relay 98 to become deenergized is greater than the length of time that the brush 37 is in contact with segments 1, 2 and 3 of ring 28, the following contact of brush 37 with these segments completes the following circuit; from battery at ring 27, over brush 37, through segments 1, 2 and 3 of ring 28, over conductor 124, through the break contact and tongue 126 of relay 127, over conductor 128, through the break contact and tongue 129 of relay 131, over conductor 132, through the tongue 133 and break contact of relay 94, over conductor 134, through the break contact and tongue 166 of relay 98, over conductor 167, through the tongue 168 and make contact of relay 157, these last two relays being deenergized and energized respectively as described above, over conductor 169, continuing through the break contact and tongue 171 of relay 94, over conductor 172 and through the coil of relay 113 to ground. This energizes relay 113 which is locked in an operated condition by a circuit through its tongue 173 and make contact, over conductor 174 and through the tongue 176 and break contact of a relay 177 to battery.

A tongue 178 of each of the code selecting relays 78 to 83 of transmitter T2 is connected by an individual conductor of cable 114 to the respective make contacts associated with the tongues 112 of relay 113. The tongues 112 of relay 113 are connected as described above through break contacts and tongues of relay 109 to respective coils of the transmitting relays 41 to 46. Therefore, for these conditions, when the relay 113 is energized, tongues 116 of the selecting relays 68 to 73 of transmitter T1 are disconnected from respective coils of the transmitting relays 41 to 46 and the tongues 178 of the selecting relays 78 to 83 connected to respective coils of the transmitting relays. The operation of relay 113 also applies ground through a make contact and tongue 179 thereof over conductor 181 and through the coil of relay 94 to battery; and thereby operating relay 94.

*Transmission from transmitter T2*

The transmission of the combinations stored in the drum of metallic storage transmitter T2 will now be described and it may be helpful to keep in mind that relays 113, 157 and 94 involved in the hereinafter described circuits are operated. As brush 37 contacts segment 13 of ring 28, the tongue of cut-off relay 51 is actuated against its marking contact in the same manner as when the transmitter T1 was sending. Then as the brushes 36 and 37 subsequently contact segments 14, 15 and 16 of rings 26 and 28 respectively, the combination stored in the selecting relays 78 to 83 will be transferred to the transmitting relays 41 to 46 as said brushes apply marking and spacing potential to the make and break contacts associated with the tongues 178 of said selecting relays. This transfer is accomplished in substantially the same manner as the transfer from the selecting relays 68 to 73 which was described above. The combination transferred from the relays 78 to 83 is the one which previously caused the operation of relay 157. During the transfer operation the cut-off relay 51 is operated to spacing causing the brush 38 to transmit a spacing start impulse which is followed by six code impulses representative of the setting of relays 41 to 46 and a rest impulse. In the meantime the next combination will be set up in the selecting relays 78 to 83. Concomitantly with the transmission of the first combination to the line, the brush 37 contacts segments 1, 2 and 3 of ring 28 and sends an impulse therefrom over conductor 124, through the break contact and tongue 126 of relay 127, over conductor 128, through the break contact and tongue 129 of relay 131, over conductor 132, through the tongue 133 and make contact of relay 94, over conductor 182, through the make contact and tongue 156 of relay 157, over conductor 158, through the tongue 159 and break contact of relay 151, over conductor 161 and through the coil of the transmitting arm operating magnet 162 to ground. This steps the transmitting arm ahead to engage the next set of selected pins in the transmitter drum and the representative combination is subsequently transmitted in the same manner as the first described combination.

The operation of the auto-stop mechanism on transmitter T2 is similar to that described above in connection with transmitter T1. Relay 151 has two opposed coils, like relay 91, and with transmitter T2 in control of the circuits, an impulse is transmitted to relay 151 as brush 37 contacts segments 10, 11 and 12 of ring 28. If the auto-stop contact is closed, this impulse divides, half going through each coil of relay 151 and not operating it. However, if the transmitting arm of the transmitter T2 has approached within two combinations of the setting-up arm, the auto-stop contact 183 will be opened, and the impulse from segments 10, 11 and 12 will operate the relay 151. The relay 151 is locked in its operated condition by a circuit through its make-before-break contact 184 and will remain energized until the setting-up arm advances to let the auto-stop contact 183 close, whereupon the next impulse from segments 10, 11 and 12 of ring 28 will neutralize the locking circuit, allowing the relay 151 to return to normal. With relay 151 operated, the circuit to the transmitting arm stepping magnet 162 is broken and meanwhile the cut-off relay 51 will cause a long marking rest impulse to be transmitted in the same manner as the rest impulse was transmitted when the auto-stop contact 137 of transmitter T1 was opened.

At the time that transmitter T2 took control of the circuits, transmitter T1 may have had a plurality of blanks between its setting-up and transmitting arms and it is desirable that the transmitting arm approach within the minimum two steps of the setting-up arm. This is accomplished by continuing the impulses to the transmitting arm operating magnet 103 until the auto-stop contact 137 is opened. It will be recalled that at the time transmitter T2 took control of the circuits relay 113 was energized which in turn caused relay 94 to be energized. The energization of relay 94 completes a circuit from segments 4, 5 and 6 of ring 28, over conductor 152, through the tongue 153 and make contact of relay 94, over a conductor 186, through the break contact and tongue 136 of relay 98 and over conductor 99 through the tongue 101 and break contact of relay 91 to the transmitting arm operating magnet 103. Thus for these conditions, each contact of the brush with segments 4, 5 and 6 will cause the transmitting arm to be advanced one step and continue to do so until the auto-stop contact 137 is opened, which in turn opens the circuit to the operating magnet 103 as hereinbefore described with the transmitting arm two steps behind the setting-up arm.

*Transfer from transmitter T2 to T1*

Assume that while the transmitter T2 had control of the circuits and was sending to the line, its stored combinations, additional characters had been stored in transmitter T1. At the next opportunity offered by transmitter T2, transmitter T1 will again take control of the circuits and send its stored combinations to the line. The tape transmitters T3 and T4 may also have combinations stored in their associated tapes ready to be transmitted by their respective transmitters, but due to the predetermined order of selection, the preferred transmitter T1 will be allowed to transmit its combinations first. This feature comprises one of the novel elements of this invention and will now be described in detail.

When the storing of combinations in transmitter T2 is completed for the time being, a plurality of blanks are stored therein. As described, this allows all the stored combinations to be transmitted and insures that the auto-stop mechanism will not stop the transmitting arm for a prolonged interval with other than blanks stored between it and the setting-up arm. When the transmitting arm comes in contact with the first stored blank, all the selecting relays 78 to 83 will be returned to their normal unoperated position. This in turn causes the deenergization of relay 157.

When the transmitter T1 begins to have combinations stored therein while transmitter T2 is transmitting, the advancement of the setting-up arm allows the auto-stop contact 137 to close. Thereupon relay 91 is deenergized and completes the above described circuit from segments 4, 5 and 6 of ring 28 through the contacts of relays 94, 98 and 91 to the operating magnet 103 of the transmitting arm. Impulses from segments 4, 5 and 6 will then cause the transmitting arm of the transmitter T1 to be advanced until the blank characters are cleared out and the contacts thereof engage a row of selected pins in the drum. As described, this will cause the selective operation of the selecting relays 68 to 73 which in turn cause the operation of relay 98. Relay 98 in turn opens the circuit of the transmitting arm operating magnet 103 and thereby halts the advancement of said arm with the tongues 66 in contact with the first stored combination in its associated drum. Now, when the next blank in transmitter T2 is associated with the contacts of its transmitting arm, the control of the operation of the distributor transmitter will be transferred back to transmitter T1. This blank allows all of the selecting relays 78 to 83 to return to their normal unoperated position which in turn causes the deenergization of relay 157. Now, as the brush 37 contacts segments 1, 2 and 3 of ring 28, an impulse will be transmitted over conductor 124, through the break contact and tongue 126 of relay 127, over conductor 128, through the break contact and tongue 129 of relay 131, over conductor 132, through the tongue 133 and make contact of relay 94, over conductor 182, through the break contact and tongue 187 of relay 157, over conductor 188, through the tongue 189 and make contact of relay 98 and over conductor 191 through the coil of relay 177 to ground. This impulse energizes relay 177 which in operating breaks the locking circuit of relay 113. As relay 113 returns to its normal condition, the tongues 178 of the selecting relays 78 to 83 are disconnected from the coils of the transmitting relays 41 to 46 and the tongues 116 of the selecting relays 68 to 73 of transmitter T1 connected thereto. At the same time the tongue 179 of relay 113 breaks the circuit of relay 94 allowing it to return to normal. Now the circuits are restored to the same conditions that they were in when transmission first began from transmitter T1 and transmitter T1 begins to transmit its second group of combinations as described above. In the meantime impulses are being transmitted to the transmitting arm operating magnet 162 of transmitter T2 from segments 4, 5 and 6 of ring 28 over conductor 152, through the tongue 153 and break contact of relay 94, over conductor 154, through the break contact and tongue 156 of relay 157 over conductor 158 and through the tongue 159 and break contact of relay 151 to the operating magnet 162 since several blanks are preferably stored in the transmitter at the end of each group of characters. These impulses continue to advance the transmitting arm until the auto-stop contact 183 is opened or a combination other than a blank is set up in the code selecting relays 78 to 83 causing either the relay 151 or relay 157 to operate and open the circuit to the operating magnet 162, as described above.

From the above description it is evident that the main function involved in switching from one storing transmitter to the other is the operating of the relay 113. All other operations lead up to the point for this operation and allow it to take place only after the complete transmission of the group of combinations stored in the transmitting transmitter.

The report of each sale on an exchange necessitates the transmission of a plurality of code combinations usually divided into three groups. The first group represents the stock or commodity sold; the second group the number of shares or the amount of the commodity sold and the third group represents the price at which the shares or commodities sold. The first group usually consists of letters and the second and third groups numerals and fractions, respectively. The combined three groups are referred to as a single quotation.

It would lead to much confusion if the switchover from one transmitter to another occurred while a quotation was only partly transmitted and the novel means by which the switchover in the middle of a quotation is prevented constitutes one of the features of this invention. Referring to the above description, the switchover can take place only when either of the relays 98 and 157 associated with the transmitter which up to this time has control of the sending circuits, is deenergized. This condition is established only when a blank is associated with the transmitting arm of the transmitting transmitter. And as the blanks are interposed in the stored combinations only between quotations or groups of quotations, a switchover can occur only between quotations or groups of quotations. Therefore, the quotations are not broken up or subdivided. If the transmission from a transmitter is halted by the auto-stop with a quotation partly transmitted, the switchover cannot occur because either of the relays 98 and 157 associated with this auto-stopped transmitter will be energized and as hereinbefore described, prevent said switching operation.

Metallic storage transmitters of the type of T1 and T2 have a limited storage capacity, determined by the number of sets of pins in their drums. In the event that one of the transmitters in control of the sending circuits should keep control of said circuits for a prolonged length of time by not transmitting any blanks to switch the control to the other transmitter, the number of combinations stored in the meantime in said other metallic storage transmitter may approach the capacity thereof. For this contingency a means is provided in connection with each storing transmitter to signal the operators at keyboards setting up combinations in the respective transmitter drums that the number of stored combinations in their respective transmitters is approaching the capacity thereof, as hereinafter described. A contact (not shown) on the transmitting arm of each metallic storage transmitter is adapted to be closed by the associated setting-up arm whenever the setting up arm approaches within a predetermined number of combinations of the transmitting arm. The closing of these contacts completes circuits to signal lamps (not shown) located adjacent the keyboard associated with respective transmitters.

*Transferring from transmitters T1 and T2 to the tape transmitting channel*

As described above, there are three sets of code selecting relays 68 to 73, 78 to 83, and 84 to 89. The third set 84 to 89 serves as the selecting relay group of both of the tape transmitters T3 and T4, and the transfer of the control of the distributor transmitter from the relays 68 to 73 to the relays 84 to 89 will now be described.

Tongues 192 of each of the tape storage transmitting channel selecting relays 84 to 89 are connected by individual conductors of a cable 193 to respective make contacts associated with the tongues 108 of the relay 109. As set forth above, the break contacts associated with the tongues 108 of relay 109 are connected through the tongues 112 of relay 113 and break and make contacts thereof to the selecting relays 68 to 73 and 78 to 83, respectively, of the storing transmitters T1 and T2. The tongues 108 are connected to the coils of the transmitting relays 41 to 46. Thus the major function in switching from either of the metallic storing transmitters T1 or T2 to the tape transmitters is the operation of relay 109. If one or both of the tape transmitters are in a condition to transmit, i. e., have perforated tape ready to be run through their respective transmitters, a combination will be set up in the code selecting relays 84 to 89 as will be hereinafter described. Also if the relays 98 and 157 are not operated, indicating that there are no combinations stored in either of their associated metallic storing transmitters T1 and T2, the circuits will immediately be set up for operating the relay 109 for switching the selecting relays 84 to 89 into control of the transmitting relays 41 to 46. The method of switching the transmitting relays 41 to 46 from transmitter T1 or T2 to transmitter T3 or T4 will first be described, after which the method of selecting either of the two transmitters T3 and T4 will be given.

Assume that transmitter T1 is in control of the transmitting circuits and the opportunity arises to allow the tape transmitting channel to transmit its stored combinations. A further assumption must be made that transmitter T2 has no stored combinations, otherwise that transmitter will be selected because of its predetermined order of selection, and in this assumption relay 157 will not be operated. The combination set up in the selecting relays 84 to 89 corresponds to the first perforated character in the tape waiting in one of the two tape transmitters. The manner in which the first character is stepped into the waiting transmitter will be explained hereinafter.

A relay 194 (Fig. 3) has one side of its coil connected to ground and the other side connected by a conductor 196 in parallel with the tongues 197 of the first five tape transmitting channel selecting relays 84 to 88. The make contacts associated with the tongues 197 are connected in parallel by a conductor 198, through the break contact and tongue 168 of relay 157, over conductor 167, through the tongue 166 and break contact of relay 98, over conductor 134, through the break contact and tongue 133 of relay 94, over conductor 132 through the tongue 129 and break contact of relay 131, over conductor 128, through the tongue 126 and break contact of relay 127 and over conductor 124 to segments 1, 2 and 3 of ring 28. Thus with a combination set up on the relays 84 to 89 one or more of the tongues 197 will be in contact with its make contact and complete a circuit from segments 1, 2 and 3 of ring 28 to the coil of relay 194, provided the relays 94, 98 and 157 are deenergized as they are when no combinations are set up in the selecting relays of transmitters T1 and T2. Therefore, as the brush 37 subsequently contacts segments 1, 2 and 3 of ring 28, the relay 194 will be energized which in turn completes a circuit from battery at the make contact of its tongue 199, over conductor 201 and through the coil of relay 109 to ground, causing relay 109 to operate. As relay 109 operates, it is locked in its operated position by its tongue 202 completing a circuit through its make contact over a conductor 203 and through the break contact and tongue 204 of relay 131 to negative potential. Relay 109 in operating also connects the code selecting relays 84 to 89 to the transmitting relays 41 to 46 and disconnects the selecting relays previously connected thereto. Thus the tongues 192 of the tape transmitter selecting relays 84 to 89 are connected to the coils of the transmitting relays and the circuits are prepared for one of the two tape transmitters to operate. Another function of relay 199 in operating, is the applying of ground through its tongue 206 and make contact over conductor 207 and through the coil of relay 127 to negative potential, which in turn causes this relay to operate. The circuits completed and broken by the operation of relay 127 will be described hereinafter.

In switching the control of the transmitting relays 41 to 46 from the selecting relays 78 to 83 of transmitter T2 to the selecting relays 84 to 89 of the tape transmitting channel, the operation is substantially the same as switching from the relays 68 to 73 to the relays 84 to 89. However, as in this instance transmitter T2 was previously transmitting the relay 94 will be energized. Now the circuit for operating the relay 194 is as described above from segments 1, 2 and 3 of ring 28 to the tongue 133 of relay 94. The circuit continues from there through the make contact of tongue 133, over conductor 182, through the break contact and tongue 187 of relay 157, over conductor 188, through the tongue 189 and break contact of relay 98, through the break contact and tongue 166 of the same relay, over conductor 167, through the tongue 168 and break contact of relay 157 and from there, as previously described, through the relay 194 to ground. Thus the control of the transmitting relays is switched from the selecting relays 78 to 83 to the selecting relays 84 to 94 when the brush 37 subsequently contacts segments 1, 2 and 3 of ring 28.

It will be noted that in the case of switching from the transmitter T2 to the tape transmitter channel, the circuits pass through relays 98 and 157 twice. Remembering that there are several combinations of conditions that may be set up and an impulse from the distributor may be required to perform a plurality of functions, switching about of such impulses is required, and the necessity for these involved circuits will be self-evident as the description proceeds.

Operation of transmitters T3 and T4

The two tape transmitters are represented at the bottom of Fig. 5 at T3 and T4. Each transmitter has six movable tongues 208 and 209 adapted to make contact with their respective marking and spacing bus bars 211 and 212 in combinations representative of the perforations in associated perforated tapes. The tongues 208 and 209 of the transmitters are connected by individual conductors of a cable 213 to the tongues 214 and 216 of relays 217 and 218 respectively. Break contacts of relays 217 and 218 associated with the tongues 214 and 216 are connected by individual conductors of a cable 219 to break and make contacts, respectively, associated with tongues 221 of a relay 222. The tongues 221 of relay 222 are connected by conductors of a cable 223 to one side of the coils of the selecting relays 84 to 89. The other sides of the coils are connected in parallel by a conductor 224 to negative potential. Thus with relays 217 and 218 unoperated the relay 222 determines which set of tongues 208 or 209 of respective transmitters T3 and T4 will be connected to the coils of the selecting relays 84 to 89. Each of the tape transmitters T3 and T4 has an operating or tape stepping magnet 226 and 227, respectively, which advance the tape therein and selectively operate the tongues in accordance with the perforations in the tape, for example as shown in the above mentioned Benjamin patent. Each of the tape transmitters also has auto-stop mechanisms including contacts 254 and 263 which when operated, as well known to those versed in the art, function to halt the passage of the tape through a transmitter and concomitantly energize the magnets 226 and 227 to withdraw the selecting pins from the tape and the transmitter functions as if blank tape were being stepped through it.

As noted, with one of the storing transmitters T1 or T2 in control of the transmitting circuits, impulses are supplied to the transmitting arm operating magnet of the other storing transmitter until the auto-stop contact is opened or the transmitting arm engages the first row of selectively operated pins. In each case means were then provided to halt the advance of the transmitting arm and in the second case the first combination was held ready for transmission at the next opportunity. Likewise, the same general conditions are established in the tape transmitters, impulses being sent to their operating magnets to advance the tape until their auto-stop functions or the selecting pins are associated with the first perforation. At these points the advancement of the tape must be halted.

As with the storing transmitters a blank combination or one wherein the variable impulses are ordinarily all spacing is employed in transferring from or to the tape transmitters. These blanks are represented in tapes by a transverse section with no holes with the exception of the feed holes and are sometimes called tape steppers. The operation of the auto-stop mechanism causes the tape transmitter to function as if blank tape were being stepped through it and unless some means were provided to prevent it, a transfer could take place when the auto-stop functions. This condition occurring in the midst of a quotation would be objectionable. Also, if the auto-stop mechanism should function while blank tape is in the tape transmitter, the switching operation to some other transmitter should not be blocked out as this transmitter would have control of the system and not be sending to it while the other transmitter may in the meantime have combinations to transmit. This condition actually occurs when the tape transmitter in control of the sending circuit completes for the time being the transmission of its stored combinations. The manner in which the two above objections are eliminated constitutes novel features of this invention and will be described later.

At the time of switching from a metallic storage transmitter to the tape transmitting channel, transmitter T3 will automatically be chosen to transmit. However, if its auto-stop is operated indicating it has no combinations to transmit, transmitter T4 will automatically be switched into the control of the selector relays 84 to 89 if it has combinations stored therefor. If while transmitter T4 is operating, transmitter T3 receives combinations to transmit and the storing transmitters have not called for the circuits, a key must be manually operated after which the transmitting circuits will be switched to transmitter T3 at the next blank occurring in the tape of the then transmitting transmitter T4. Likewise, operating the key will cause the switch to be made in the opposite direction if transmitter T3 had been sending and it was desired to switch to transmitter T4. In each of the above cases, if one of the storing transmitters had had combinations to transmit at the time a blank occurred in the tape of the transmitting tape transmitter, the transfer function of the key would have for the time being been nullified, but the operation of the key would cause the tape transmitter which was to have been selected, to be selected when the tape transmitting channel is again connected to the transmitting relays.

*Operation of transmitter T3*

During the time combinations were being transmitted from transmitters T1 and T2, stepping impulses were being supplied to the operating magnets 226 and 227 of transmitters T3 and T4. These impulses advance the perforated tape to operate their associated auto-stops or to bring a character other than a blank into register with the selecting pins, at which times further stepping impulses were blocked out as will be hereinafter described. Until such conditions did occur, the impulses to the stepping magnet of the tape transmitter T3 were from segments 7, 8 and 9 of ring 26 over a conductor 229 through the tongue 231 and break contact of a relay 232, over a conductor 233, through the break contact and tongue 234 of relay 127, over a conductor 236, through a series arrangement of tongues 237 and break contacts of the first five relays of the selecting relays 84 to 89, over a conductor 238, through the tongue 239 and break contact of relay 127, over conductor 241, through the tongue 242 and break contact of relay 232, over a conductor 243 and in parallel to the break contacts associated with the tongues 244 and 246 of relays 217 and 218 respectively. As hereinafter described, for the assumed conditions relays 217 and 218 will be unoperated and operated, respectively, which allows the circuit to be continued only through the tongue 244 of relay 217. The circuit from the tongue 244 continues over a conductor 247 through the tongue 248 and break contact of a relay 249, over a conductor 251, in parallel through both coils of the auto-stop relay 252 of transmitter T3 and over a conductor 253 through the operating magnet 226 to ground. The circuit for advancing the blank tape in transmitter T4 is from segments 1, 2 and 3 of ring 26 over a conductor 287, through the tongue 289 and break contact of relay 232, over a conductor 291, through the make contact and tongue 246 of relay 218, over a conductor 256 through the tongue 257 and break contact of a relay 258, over a conductor 259, in parallel through both coils of the auto-stop relay 261 of transmitter T4 and over a conductor 262 through the associated operating magnet 227 to ground. Relays 252 and 261 are double coil relays with the windings opposed so that they will not operate as long as current flows through both windings as a result of the closure of their associated auto-stop contacts 254 and 263. The operation of the auto-stop relays will be described later. Thus stepping impulses are supplied to the operating magnets of transmitters T3 and T4 as long as their auto-stops remain closed and no combinations have been stepped into association with the selecting pins.

Let it be assumed that the transmitter T3 is to be responsible for switching the control of the transmitting relays from a set of storing transmitter selecting relays to the tape channel selecting relays 84 to 89. As described, relay 109 performed this switching function which is controlled by relay 194, which in turn received its operating impulse from segments 1, 2 and 3 of ring 28 when the conditions were as assumed. Relay 109 in operating causes relay 127 to operate which connects segments 4, 5 and 6 of ring 26 by a conductor 264 through the tongue 266 and make contact of relay 127 and then over conductor 241 and the described circuit to the operating magnet 226 of transmitter T3. The stepping circuit for advancing the blank tape in transmitter T4 is not disturbed by the operation of the above mentioned relays and continues to be supplied from segments 1, 2 and 3 of ring 26 as described above. The stepping impulse for transmitter T3 immediately follows the impulse which operates relay 194 and if some means were not provided to prevent it, this impulse would operate the magnet 226 and advance the tape another step. This would step the perforation in the tape that caused the switching operation, to be stepped out of operative relation with the selecting pins before it was transferred to the transmitting relays and thereby causing the loss of the first combination every time a switch to the tape transmitting channel was made. Relays 232 and 267 are provided to block out this first stepping impulse at the time the switch is made. As relay 194 causes the operation of relay 109, it also causes the operation of relay 232 by applying negative potential through its make contact and tongue 268 and over conductor 269 through the coil of relay 232 to ground. Relay 232 is locked in its operated position by a circuit through its tongue 271 and make contact and over conductor 272 through the tongue and break contact of relay 267 to negative potential. Thus when relay 194 operates by an impulse from segments 1, 2 and 3 of ring 28, it in turn causes relay 232 to operate which at its tongue 242 opens the circuit from segments 4, 5 and 6 of ring 26 to the stepping magnet of transmitter T3. As relay 232 operates its tongue 289 opens the described stepping circuit to transmitter T4 from segments 1, 2 and 3 of ring 26. The breaking of this circuit performs no useful function at the time and its purpose will be evident hereinafter. As the brush 36 subsequently contacts segments 7, 8 and 9 of ring 26, an impulse passes over the conductor 229 through the tongue 231 and make contact of relay 232 and over a conductor 274 through the coil of relay 267 to ground, thus momentarily operating said relay. This relay in operating interrupts the locking circuit of relay 232 which returns to normal and restores the stepping circuits to transmitters T3 and T4 which were interrupted by the operation thereof. Thus the stepping impulse which would ordinarily immediately follow the switching operation to the tape transmitting channel is blocked out for one and only one revolution of the brush 36. This operation is completed each time a switch is made to one of the tape transmitting channels, or when a switch is made between two tape transmitters.

In assuming that the conditions are set up to switch to and transmit from transmitter T3, it must also be assumed that relays 222 and 217 are unoperated at this time and also that one of the storing transmitters is in control while tape is being perforated for transmitter T3.

Before the switch to the tape transmitting channel was made, as described, relays 109 and 127 are unoperated. Also, with blank tape in transmitter T3, all the relays 84 to 89 will be unoperated as the circuits to the coils thereof are open at the tongues of the transmitter T3.

As described, the stepping impulses to the operating magnet 226 continue to be transmitted from segments 7, 8 and 9 of ring 26 for each revolution of the brushes until a character other than a blank is stepped into association with the selecting pins of the tape transmitter T3. When this occurs, one or more of the tongues 208 will be operated to make contact with the grounded bushbar 211 and thus complete a circuit through its associated selecting relay. As one or more of the selecting relays 84 to 89 operate, the series circuit through the tongues 237 thereof is opened and this stops all following stepping impulses from segments 7, 8 and 9 of ring 26. This holds the first combination in the tape which has caused the selective operation of the selecting relays 84 to 89. Remembering that the operation of a selecting relay 84 to 89 also completes a circuit through its tongue 197 whereby a switching impulse from the distributor is allowed to cause the operation of the switching relay 109 when the storing transmitters T1 and T2 have finished transmitting, it can be seen that the operation of the tape transmitter selector relays prepares the system for transfer to the tape transmitter which has combinations to transmit.

As the switch is made according to the manner described, relays 109 and 127 are operated and locked. All other relays with the exception of the selecting relays will remain in their normal positions. Then as the brushes 36 and 37 contact segments 14, 15 and 16 of rings 26 and 28 respectively, marking and spacing battery is applied over the circuits described and conductors 276 and 277 to the break and make contacts respectively, associated with the tongues 192 of relays 84 to 89. These impulses cause the selection in the selecting relays 84 to 89 to be transferred to the transmitting relays 41 to 46, the operation of the cut-off relay 51, and the selection to be transmitted to the line in the manner already described.

Similarly, as with the storing transmitters, a different impulse is used to advance the tape in the tape transmitter when it is transmitting than the impulse which previously advanced blank tape. The blank tape advancing impulse, as described, was from segments 7, 8 and 9 of ring 26 and was momentarily blocked out by relay 232 at the time the switch to the tape transmitting channel was made. Relay 127 in operating blocks out further stepping impulses from segments 7, 8 and 9 of ring 26 through the tongue 234 of said relay. The tongue 266 of relay 127 is connected to segments 4, 5 and 6 of ring 26 and when said relay is operated, supplies stepping impulses through its make contact, over conductor 241 and continuing over the circuits described to the tape transmitter operating magnets. Thus one of the functions of relay 127 is to open the blank tape stepping circuit which passed through the series connections of the tongues 237 of relays 84 to 89 and complete another stepping circuit.

The auto-stop relay 252 operates in a manner similar to that described for the storing transmitters, with the exception that the tape stepping impulse also operates the relay. With the auto-stop contact 254 closed, the stepping impulse divides at 278, half going through the auto-stop contact 254 and through the left hand winding of the relay 252 to the tape stepping magnet 226, the other half going through the make-before-break contact 279 through the right hand winding of relay 252 to the tape stepping magnet. The windings of relay 252 are opposed and the passage of the stepping impulse through both windings does not operate it. However, if the auto-stop contact 254 is opened, the stepping impulse will pass through only the right hand winding, thereby causing it to operate and apply locking negative potential at the tongue 281 through this winding and the tape transmitter magnet 226 to ground, holding both relay and transmitter stepping magnet 226 in their operated positions. When the auto-stop contact subsequently closes, the succeeding regular negative potential stepping impulse will pass through the left hand winding of relay 252, neutralizing the negative locking circuit, and continues through the stepping magnet 226 to ground, allowing said magnet to complete its stepping function. As the magnet 226 is energized when the auto-stop contact 254 is opened, the selecting pins in the tape transmitter are all held down, which causes all the selecting relays 84 to 89 to be unoperated. This causes a long rest impulse to be transmitted to the line by the distributor transmitter and prevents the combination that is represented by the perforation over the selecting pins from being repeated over and over for every revolution of the distributor brushes. Other functions of the auto-stop relay 252 will be described later. The auto-stop contact 254 is mechanically operated by shortening of the loop of the tape between the transmitter T3 and a perforator in the usual manner.

It will be noted that there is no tongue of selecting relay 89 included in the series circuit which passes through the tongues 237 of the other five selecting relays 84 to 88. This is because there is no combination to be transmitted which uses this corresponding impulse alone and therefore it is not necessary to include this impulse in the series circuit which signals the system that the tape transmitting channel is ready to transmit.

*Stepping blank tape through tape transmitters T3 and T4*

While the transmitter T3 is operating, characters may be perforated in the tape associated with transmitter T4. As in the case of the metallic storing transmitter, means as described is provided to step the blank tape in this transmitter ahead to bring the first perforation into association with the selecting pins. Thereupon the advancement of the tape is halted and the first combination held ready for transmission when the line becomes available.

As described, when a metallic storing transmitter is transmitting, stepping impulses are supplied to the stepping magnets of the tape transmitters to advance the blank tapes therein. However, when one of these tape transmitters, such as T3, selectively operates the selecting relays 84 to 89, the stepping impulse to this transmitter is blocked out and another circuit is set up to allow other stepping impulses to operate this transmitter when the storing transmitters T1 and T2 allow it to transmit. While one tape transmitter is thus held inoperative, the other is supplied with stepping impulses to bring the first perforation in its tape into association with the selecting pins or to operate its autostop.

The relay 222 is the main switching relay for the tape transmitting channel and relays 217 and 218 are secondary switching relays associated with transmitters T3 and T4 respectively. When relay 222 is in its normal unoperated position, its tongue 282 applies ground through its break contact over conductor 283 and through the coil of relay 218 to battery, thus causing said relay to be operated. When relay 222 is operated, the tongue 282 applies ground through its make contact, over conductor 284 and through the coil of relay 217 to battery causing it also to be operated. Referring to the above described circuits, it can be seen that the secondary switching relays 217 and 218 will be in their normal positions when their associated transmitters are connected to the selecting relays 84 to 89.

Assuming that transmitter T3 is transmitting, the main switching relay 222 will be unoperated and the secondary switching relays 217 and 218 will be unoperated and operated respectively. Relays 217 and 222 being unoperated allow the tongues 208 of transmitter T3 to be connected to and control the selecting relays 84 to 89. Relay 218 being operated allows the tongues 216 thereof, which are connected to the tongues 209 of transmitter T4, to be in contact with their associated make contacts. The make contacts of the five tongues 216 are connected in parallel by conductor 286 through the coil of relay 258 to battery. Thus it can be seen for these conditions that when the first perforation is stepped into transmitter T4, a tongue 209 thereof will make contact with the grounded bus bar 211 and by the described circuit cause the energization of relay 258. Up to this time a circuit was complete from segments 1, 2 and 3 of ring 26, over conductor 287, through the tongue 289 and break contact of relay 232, over conductor 291 through the make contact and tongue 246 of relay 218 over conductor 256, through the tongue 257 and break contact of relay 258 over the described circuit to the stepping magnet 227 of transmitter T4 to ground. Therefore, as the first character perforated in the tape of transmitter T4 causes the operation of relay 258, the stepping circuit is broken and this first character stays associated with the selecting pins.

Substantially the same operations occur when transmitter T4 is sending and a perforation is stepped into transmitter T3. For this condition relays 217 and 222 will be operated and relay 218 unoperated, thereby connecting the tongues 209 of transmitter T4 to the selecting relays 84 to 89 and connecting the operated tongues 208 of transmitter T3 in parallel by conductor 292 through the coil of relay 249 to battery. Thus when the tongues 208 make contact with the grounded bus bar 211 as the first character other than a blank in the associated tape is stepped over the selecting pins, relay 249 will be operated. Up to this time the stepping impulses for stepping magnet 226 were from segments 1, 2 and 3 of ring 26 as traced to conductor 291 through the make contact and tongue 244 of relay 217, over conductor 247, through the tongue 248 and break contact of relay 249 and as described, to the magnet 226. Therefore, the first character in the tape to selectively operate the tongues 208 of transmitter T3 causes the operation of relay 249 which opens the circuit to the stepping magnet 226 and holds said first character associated with the tongues 209.

*Transfer from transmitter T3 to T4*

Assume that transmitter T3 is sending and with neither of the metallic storing transmitters T1 and T2 having combinations to send, it is desired to send from transmitter T4. Thereupon the operator depresses the key 293 and at the next blank combination in the tape in transmitter T3, the control of the selecting relays 84 to 89 will be transferred to transmitter T4, provided one of the storing transmitters has not or does not in the meantime have combinations to transmit.

As has been described, relay 222 is the switching relay that determines which of the two tape transmitters is to have control of the selecting relays 84 to 89. Thus the switching from one of the tape transmitters to the other simply involves the energization or deenergization of relay 222.

With transmitter T3 controlling the selecting relays 84 to 89, relays 222 and 217 will be unoperated and relay 218 operated. When the key 293 is depressed, ground is applied through the key over conductor 294, through the coil of a relay 296 and over a conductor 297 through the tongue 298 and break contact of relay 217 to negative potential. This causes the energization of relay 296 which is locked in its operated position by ground being applied to its coil through its tongue 299 and make contact. The key 293 is self-restoring and automatically returns to its normal position after being released. The control of relays 84 to 89 may now be switched to transmitter T4 and this will occur at the next blank in the tape, controlling transmitter T3 unless the storing transmitters T1 and T2 have in the meantime received combinations to transmit. Assume that transmitters T1 and T2 have not called for the circuits and that the first character perforated in the tape is held, in the manner described, over the selecting pins of transmitter T4. When this blank appears in the transmitter T3, all the selecting relays 84 to 89 will be unoperated.

The next passage of the brush 37 over segments 1, 2 and 3 of ring 28 completes a circuit therefrom over conductor 124, through the make contact and tongue 234 of relay 127, over conductor 236 through the series arrangements of tongues 237 and break contacts of relays 84 to 88, over conductor 238, through the tongue 239 and make contact of relay 127, over a conductor 301, through the tongue 302 and make contact of relay 218, over conductors 303 and 304, through the break contact and tongue 306 of the auto-stop relay 252, over conductors 307 and 308 through the tongue 309 and break contact of relay 157, over conductor 311, through the tongue 312 and break contact of relay 98, over conductor 313, through the make contact and tongue 314 of relay 127, over conductor 316, through the key 293, over conductor 317 through the make contact and tongue 318 of relay 296, over conductor 319, through the make contact and tongue 321 of relay 258 and over conductor 322 through the coil of relay 222 to ground. Relay 222 is thereby operated and locked in its operated position by a circuit from ground through its coil, through its tongue 323 and make contact, over conductor 324, through the break contact and tongue 326 of a relay 327, over a conductor 328 and through the break contact and tongue 329 of relay 131 to positive potential. It may be helpful to give the reasons why some of the relays involved in the above circuits for the operation of relay 222 are operated and unoperated. Relay 127 is operated because the locking circuit to relay 109 has not been broken which in turn causes relay 127 to be operated. Relays 84 to 88 will not be operated because there is blank in transmitter T3 which is at this time connected to relays 84 to 89. Relay 218 is operated because the circuit thereto is completed when relay 222 is unoperated. The circuit to relay 222 passes through a break contact and tongue of the auto-stop relay 252 because when the auto-stop is operated, the series circuit through the tongues 237 and break contacts of relays 84 to 88 is completed and if the circuit did not thus pass through a break contact of relay 252, relay 222 could be operated when the auto-stop relay 252 was operated with combinations in the tape over the selecting pins. This might result in shifting in the midst of a quotation and not when a blank is being transmitted as desired. Relays 98 and 157 are unoperated, because for the assumed conditions none of the selecting relays 68 to 73 or 78 to 83 are operated as transmitters T1 and T2 have no combinations to transmit. Relay 296 will be operated as the operation of the key 293 with relay 217 unoperated causes its energization. Relay 258 will be operated because it is assumed that there are perforations in the tape over the pins in transmitter T4, which as described causes the energization of relay 258. As relay 222 operates, it causes relay 217 to be operated and relay 218 to become unoperated and the joint operation of the three relays disconnects transmitter T3 from the selecting relays 84 to 89 and connects the transmitter T4 thereto. In tracing the above circuit of relay 222 it is evident that the switching operation can take place only when the following four conditions are fulfilled: first, blank tape must be over the selecting pins of the transmitter from which the switch is made; second, there must be no combinations stored in either of the storing transmitters; third, the auto-stop of the transmitter from which the switch is made must be unoperated; fourth, the transmitter to which the switch is made must have the first perforated character in the tape over its selecting pins.

It will be remembered that when a transfer from a storing transmitter to the tape transmitting channel is made, it was necessary to block out the first regular stepping impulse after the transfer was made in order not to step the combination responsible for the switching out of the transmitter before it was transmitted to the line. The same condition exists in switching from one tape transmitter to the other and the same relay 232 blocks out this first stepping impulse but a different circuit to this relay is established.

Concomitantly as the brush 37 contacts segments 1, 2, and 3 of ring 28 to initiate the switching impulse, the brush 36 contacts segments 1, 2 and 3 of ring 26 and establishes a circuit therefrom over conductor 287, through a series arrangement of tongues 323 and break contacts of relays 84 to 88, over a conductor 324, through the tongue 326 and make contact of relay 127, over conductor 327, through the make contact and tongue 328 of relay 296, over conductor 329, through the tongue 331 and make contact of relay 258, over conductor 332 through the tongue 333 and break contact of the auto-stop relay 261 of transmitter T4, over conductor 334, through the break contact and tongue 336 of the auto-stop relay 252 of transmitter T3, over conductor 337 and through the coil of relay 232 to ground. This causes relay 232 to operate and it is locked in its operated position by the tongue of relay 267. The stepping impulse which advanced the tape in transmitter T4 up to the time the first perforation registered was from segments 4, 5 and 6 of ring 26 and passed through tongues and break contacts of relays 232 and 258. When this perforation registered, the stepping circuit was opened at relay 358 as described. However, the relay 258 was returned to normal at the time of switching and again completes the stepping circuit. Concomitantly with the return of relay 258 to normal, relay 232 was opened by an impulse from segments 1, 2 and 3 of ring 28 and again opened the stepping circuit. Therefore as the brush 36 subsequently contacts segments 4, 5 and 6 of the ring 28, the stepping impulse therefrom will not be effective to step the tape in transmitter T4. However, as the brush 36 contacts segments 7, 8 and 9, a circuit is completed through the tongue 231 and make contact of relay 232 to the coil of relay 267 to energize said relay which in operating opens the locking circuit to relay 232. As relay 232 returns to normal, the stepping circuit is again restored.

*Transfer from transmitter T4 to T3*

The manner in which the control of the transmitting relays 41 to 46 and the selecting relays 84 to 89 of the tape transmitting channel is switched from tape transmitter T4 to tape transmitter T3 will now be described. This operation is substantially the same as switching from tape transmitter T3 to tape transmitter T4. Assume that the described stepping circuit brings a character other than a blank in the tape of transmitter T3 over the pins while transmitter T4 is transmitting. When transmitter T4 is sending the tape switching relays 217 and 222 will be energized and relay 218 deenergized. The first perforation in transmitter T3 will therefore allow one or more of the tongues 208 to contact the grounded bus bar 211 and thereby complete a circuit through a tongue 214 and make contact of relay 217 and over conductor 292 through the coil of relay 249 to ground, operating said relay. The stepping circuit from segments 4, 5 and 6 of ring 26 for the operating magnet 226 ordinarily passes through the tongue 248 and break contact of relay 249. Therefore, the energization of relay 249, as described, opens the stepping circuit and causes the first perforated character to be held in transmitter T3.

With a character stored in transmitter T3, the conditions are such that transmission therefrom would be desirable at the next opportunity. The operator thereupon operates the key 293 which for these conditions applies ground over conductor 338 through the coil of a relay 339, over conductor 341 and through the tongue 342 and break contact of relay 218 to negative potential, causing the operation of relay 339. Relay 339 in operating locks itself by applying ground from its tongue 343 and make contact through its coil. The next blank to appear in transmitter T4 will allow all the selecting relays 84 to 89 to return to normal and restore the series circuit through the tongues 237 and break contacts thereof. The following passage of the brush 37 over segments 1, 2 and 3 of ring 28 completes a circuit therefrom over conductor 124, through the make contact and tongue 234 of relay 127, over conductor 236, through the series circuit of tongues 237 and break contacts of relays 84 to 88, over conductors 238, through to tongue 239 and make contact of relay 127 again, over conductors 301 and 344, through the tongue 347 and break contact of relay 261 and over conductor 348 to a point 349. From point 349 there is a parallel path for the circuit, one path being over conductors 304, 303, through the make contact and tongue 351 of relay 217 and over conductor 352 to a point 353. The other path is from point 349 through the break contact and tongue 306 of relay 252 and over conductor 307 to point 353. The purpose of this parallel path will be evident later in the description. From point 353 the circuit continues over conductor 308, through the tongue 309 and break contact of relay 157, over conductor 311, through the tongue 312 and break contact of relay 98, over conductor 313, through the make contact and tongue 314 of relay 127, over conductor 316, thru the key 293, over conductor 317, through the make contact and tongue 354 of relay 339, over conductor 356, through the make contact and tongue 357 of relay 249 and over conductor 358 through the coil of relay 327 to ground. This causes the energization of relay 327 which in turn breaks the above described locking circuit of relay 222. As relay 222 returns to its normal position, the tongue 282 thereof breaks the circuit to relay 217 and completes a circuit to relay 218 causing the deenergization and energization of these two relays respectively. Thus the control of the tape channel selecting relays 84 to 89 is switched from transmitter T4 to T3 at the next blank in the tape in transmitter T4 provided that the storing transmitters T1 and T2 have not in the meantime received combinations to transmit. The first tape stepping impulse to transmitter T3 after the switchover is blocked out in exactly the same manner as described above by relay 232.

*Transferring directly from transmitters T1 or T2 to tape transmitter T4*

As described, transmitter T3 is ordinarily automatically chosen to transmit when a switch to the tape transmitting channel is made from either of the metallic storing transmitters T1 and T2. However, it may be desirable to switch directly to transmitter T4 from one of the storing transmitters even when transmitter T3 has combinations stored therein and a description of the circuits therefor will now be given. Let it be assumed that either of the storing transmitters is in control of the sending circuits and that it is desired to transmit from transmitter T4 before transmitting from transmitter T3 at the next opportunity to transmit from the tape transmitting channel, this opportunity occurring when the operative storing transmitter finishes transmitting and the other storing transmitter has no combinations to transmit. While a storing transmitter is operating, the key 293 is operated. When the tape transmitting channel gives up the control of the sending circuits, relay 222, if not in a normal position, is thereupon returned to normal as will be hereinafter described. Therefore, at the time the key 293 is operated, relays 217 and 218 will be unoperated and operated respectively. Thus the operation of the key 293 causes relay 296 to be operated as described above and locked in its operated position. The next passage of the brush 34 over segments 11, 12 and 13 of ring 23, completes a circuit from battery over conductor 361 through the break contact and tongue 314 of relay 127 over conductor 316, through the key 293, over conductor 317, through the make contact and tongue 318 of relay 296, over conductor 319 through the make contact and tongue 321 of relay 258 and over conductor 322 through the coil of relay 222 to ground. This causes the operation of relay 222 which in turn causes the operation of relay 217 and the release of relay 218, thereby connecting the transmitter T4 to the tape transmitter channel selecting relays 84 to 89. Now when a switch to the tape transmitting channel is made as has already been described, the transmitter T4 will start sending. The relays 127 and 258 involved in the above described circuit for energizing relay 222 are unoperated and operated respectively. Relay 127 is unoperated because it was assumed that a storing transmitter was transmitting and therefore relay 109 will be unoperated which controls the circuit to relay 127. Relay 258 will be operated due to the first perforated character in the tape in transmitter T4. With transmitter T4 transmitting, the operation of key 293 will cause a switch to transmitter T3 at the next blank in the tape of transmitter T4 as has been described.

Assume that one of the metallic storing transmitters is sending and the other storing transmitter and tape transmitter T3 have no combinations stored therein but that tape transmitter T4 has combinations. Under these conditions it would be desirable when the sending storing transmitter completes sending its combinations to switch automatically to transmitter T4 without the necessity of having to manually operate the key 293, provided the other storing transmitter or transmitter T3 has not in the meantime received combinations. With no combinations in transmitter T3 the blank tape will cause the auto-stop contact 254 to be opened. The next stepping impulse will therefore pass through the make-before-break contact 279, the right hand coil only of relay 252 and the stepping magnet 226 to ground, causing the operation of relay 252 which is locked by negative battery being applied to the right hand coil through the tongue 281 thereof. The first character in the transmitter T4 will, as described, cause the operation of relay 258. With relays 252 and 258 operated a circuit is completed from battery through the break contact and tongue 298 of relay 217, over conductor 297, through the coil of relay 296, over conductor 294, through the make contact and tongue 362 of relay 252, over conductor 363, through the make contact and tongue 364 of relay 258, over conductor 366 and through the break contact and tongue 206 of relay 109 to ground. This causes the automatic operation of relay 296 and from now on the conditions are the same as when the key 293 was operated to cause the transfer to transmitter T4 from a storing transmitter T1 or T2. The above conditions exist when both of the relays 252 and 258 operate, the operations of each being independent of the other and each operate due to their respective conditions.

Thus the tape transmitter T4 will be automatically selected if it has combinations to transmit and the transmitter T3 has not, when both of the metallic storage transmitters have finished transmitting.

*Transmission from transmitter T4*

The transmission from transmitter T4 is substantially the same as from transmitter T3 after a switch thereto has been made by any one of the methods described above. The tongues 209 of transmitter T4 are connected through tongues and contacts of relays 218 and 222 to the coils of the tape channel selecting relays 84 to 89. From the selecting relays 84 to 89 the combinations are transferred to the transmitting relays 41 to 46 and subsequently transmitted therefrom in the usual manner as described above. Impulses from segments 4, 5 and 6 of ring 26 are used to operate the transmitter and are applied to the described stepping circuit at the tongue 268 and make contact of relay 127. The auto-stop relay 261 of transmitter T4 operates in the same manner as the described auto-stop relay 252 of transmitter T3. When operated it locks the operating magnet 227 of transmitter T4 in its energized position causing the selecting relays 84 to 89 to be spacingly operated and transmit a prolonged rest or marking impulse to the line.

*Transferring from the tape transmitting channel to a storing transmitter*

When a tape transmitter is in operation, the control of the transmitting distributor may be switched to either of the storing transmitters. It has been explained how relays 98 and 157 are operated when there are combinations stored in their associated transmitters T1 and T2, signalling to the system that they are in a condition to transmit. In the event that one of these relays becomes operated while one of the tape transmitters is sending, the circuits will be automatically prepared to switch to the associated storing transmitter. At the next blank occurring in the tape in the operating transmitter, the transfer will be made. If both relays 98 and 157 should become operated before the transfer is made, the storing transmitter T1 will be chosen first because of the predetermined order of selection as will be described. The transfer is then made to the storing transmitter T2 in the manner described, at the first blank in transmitter T1. The circuits will now be traced and described for switching between each of the tape transmitters and each of the storing transmitters.

*Transfer from transmitter T3 to T1*

When transmitter T3 is in operation it will be remembered that relays 109, 127 and 218 are operated. As it is assumed that the transfer is to be made to transmitter T1, its associated relay 98 will be operated indicating there are combinations to be transmitted therefrom. The transfer will be made at the next blank in the tape transmitter T3 which will be indicated by the tape channel selecting relays 84 to 89 being in their unoperated position at the same time that the auto-stop relay 252 is not operated.

When this condition exists, the brush 37 contacting segments 1, 2 and 3 of ring 28 will establish a circuit therefrom over conductor 124, through the make contact and tongue 234 of relay 127, over conductor 236, through the series arrangement of tongues 237 and break contacts of relays 84 to 88, over conductor 238, through the tongue 239 and make contact and relay 127 again; over conductor 301, through the make contact and tongue 302 of relay 218, over conductors 303, and 304, through the break contact and tongue 306 of relay 252, over conductors 307 and 308, through the tongue 309 and break contact of relay 157, over conductor 311, through the tongue 312 and make contact of relay 98 and over a conductor 365 through the coil of relay 131 to ground. This causes relay 131 to operate which in turn by means of its tongue 204 opens the locking circuit to relay 109. Relay 109 thereupon returns to its normal position and in so doing opens the circuit to relay 127 which also returns to normal. Relay 109 in returning to normal also disconnects the tongues 192 of the tape channel selecting relays 84 to 89 from the transmitting relays and connects the tongues 112 of relay 113 thereto. If transmitter T2 had been the last storing transmitter to transmit, prior to the switch over to the tape transmitting channel, relay 113 would have been left operated. Thus in order to connect transmitter T1 to the transmitting relays 41 to 46, it is necessary to return relay 113 to normal at the same time relay 109 is returned to normal. It will be remembered that relay 113 was locked operated by a circuit through the tongue 176 and break contact of relay 177. Thus to return relay 113 to normal it is necessary to operate relay 177. If relay 113 had been in its unoperated position, it would not be necessary to operate relay 177 but to insure proper operation it is operated each time a transfer is made from the tape transmitting channel to transmitter T1. The circuit to relay 177 is from battery at the make contact and tongue 367 of relay 131 over conductor 368, through the tongues 369 and make contact of relay 98 and over conductor 191 through the coil of relay 177 to ground, causing it to operate.

It will be noted that the regular stepping impulses from segments 1, 2 and 3 of ring 28 for operating the transmitting arms of transmitters T1 and T2 pass through the tongue 129 and break contact of relay 131. The reason for this is that the relays 109 and 127 operate so fast that they will be in their normal position before the brush 37 completes its passage over segments 1, 2 and 3. The relay 131 is energized during the time the brush 37 is passing over segments 1, 2 and 3 and the break contact thereof opens the stepping impulse circuit during this time. If the circuit were not opened at relay 131, the remainder of the circuit would be completed while the brush was on segments 1, 2 and 3 to operate the stepping magnet 103 and cause the loss of the first combination stored in transmitter T1 every time a switch was made thereto from the tape transmitting channel. After the switch has been made, the circuits are back in the same condition that they were when transmission from transmitter T1 was first described.

*Transfer from transmitter T4 to T3*

In this case it will be assumed that transmitter T4 is operating and only transmitter T2 of the storing transmitter has combinations to transmit. The next blank to be stepped into transmitter T4 will set up the conditions for the transfer. For the assumed conditions of transmitter T4 operating and transmitter T2 having combinations stored therein, relays 109, 127, 157, 217 and 222 will be operated. When the next blank is stepped over the pins in transmitter T4 the selecting relays 84 to 89 will be returned to normal. Thus the next passage of brush 37 over segments 1, 2 and 3 of ring 28 completes a circuit therefrom over conductor 124 through the make contact and tongue 234 of relay 127, over conductor 236, through the series arrangement of tongue 237 and break contacts of relay 84 to 88, over conductor 238, through the tongue 239 and make contact of relay 127, over conductors 301 and 344, through the tongue 347 and break contact of relay 261, over conductors 348 and 304 through the make contact and tongue 351 of relay 217, over conductors 352 and 308, through the tongue 309 and make contact of relay 157 and over conductor 365 through the coil of relay 131 to ground, causing said relay to operate. As in the previously described transfer, the energization of relay 131 causes the deenergization of relays 109 and 127. If transmitter T2 had been the previous storing transmitter to operate, relay 113 would be operated, but as there is no way of determining its condition, an operating impulse from battery at the make contact and tongue 367 of relay 131, over conductor 368, through the tongue 369 and break contact of relay 98, over conductor 172 is applied through the coil of relay 113 to ground. This impulse insures that relay 113 is operated and it is locked as described. From here on the operation of the system is the same as described under the operation of transmitter T2.

It will be remembered that when transmitting from transmitter T4 relay 222 is locked in its operated condition by a circuit through its make contact and tongue 323 over conductor 324, through the tongue 326 and break contact of relay 327, over conductor 328 and through the break contact and tongue 329 of relay 131 to positive potential. Thus as a transfer is made from transmitter T4 to one of the metallic storage transmitters, the operation of relay 131 causes relay 222 to return to normal, which in turn, as described, causes relays 217 and 218 to assume their unoperated and operated positions respectively. Therefore, under normal conditions, which is when the key 293 is not operated in the meantime, transmitter T3 will be given first opportunity to transmit at the following transfer to the tape transmitting channel.

*Transfer from transmitter T4 to T1*

If the relay 98 had become operated, indicating there were combinations stored in transmitter T1, before the last described transfer was made, then both relays 98 and 157 would be operated. In this case relay 131 would also be operated by an impulse from segments 1, 2 and 3 of ring 28 through the described circuit including the tongue 309 and make contact of relay 157. However, with relay 98 operated, the impulse from battery at the make contact and tongue 367 of relay 131 passes over conductor 368 through the tongue 369 and make contact of relay 98 and over conductor 191 through the coil of relay 177, to energize said relay which breaks the locking circuit to relay 113, if it is locked operated. If relay 98 were not operated, the impulse from battery at the tongue 367 and make contact of relay 131 would pass through the tongues 369 and break contact of relay 98 over conductor 172 to the coil of relay 113, to energize the same. With relay 113 energized, transmitter T2 is connected to the transmitting relays 41 to 46, and with said relay deenergized, transmitter T1 is connected thereto. Thus when a switch to the storing transmitter is made the condition of relay 113 determines which of the storing transmitters will be chosen and transmitter T1 will be chosen with combinations in both transmitters although transmitter T2 may have called for the circuits first.

Transfer from transmitter T3 to T2

This transfer takes place in substantially the same manner as the previously described transfers. For this transfer it will be assumed that transmitter T3 is operating and that only transmitter T2 of the storing transmitters has combinations to transmit as indicated by relay 157 being energized. At the next blank to be stepped into transmitter T3 the circuit to relay 131 will be completed and cause the energization thereof. Relay 131 in operating supplies an impulse to operate either relay 113 or 177 and which relay is operated depends upon the conditions of relays 98 and 157. It will be noted that the tongue 309 of relay 157 is a common point in switching from the tape transmitting channel to a storing transmitter and the operations which take place on both sides of this point are independent of each other.

Auto-stop operation of transmitters T3 and T4

Whenever the auto-stop relay associated with one of the tape transmitters T3 or T4 is operated, a condition is set up whereupon the switching circuits could be operated unless the auto-stop is made to open these circuits. In the switching circuits described for switching within the tape transmitting channel, it has been explained how a switching operation can take place only when the auto-stop relay associated with the operating tape transmitter is not operated. Assume that the auto-stop relay of the tape transmitter connected to the line becomes operated while a section of blank tape is passing through the transmitter, which is the case when this transmitter completes sending for the time being. If there were no switching circuits prepared previous to this time, so that a switch would have been made to one of the other transmitters before the auto-stop relay operates, it would be possible for the associated transmitter to tie up the switching circuits, and, unless more blanks or combinations were perforated in the tape to allow the auto-stop contact to close, the other transmitters would be prevented from transmitting. Thus it is necessary to provide means for shorting out the circuits through the contacts of the auto-stop relay at times when there is blank tape in the transmitters. A relay 371 is provided for this purpose and every time a blank passes through the operating tape transmitter, provided circuits have not been established to switch to another transmitter, relay 371 will be operated and locked in its operated position until combinations again appear in the transmitter. As relay 371 operates, its tongue 372 shorts out the series circuit through the tongues 333 and 336 of relays 261 and 252 respectively. Also, the tongue 373 of relay 371 in operating shorts out either of the circuits through the tongues 306 and 347 of the auto-stop relays depending on which tape transmitter is operating; thus if relay 252 or 261 should become operated before more combinations appear in the operating transmitter, the switching circuits will be immediately prepared when one of the other transmitters signals the system it has combinations to transmit. Consequently, it is impossible for one of the tape transmitters to tie up and hold the control of the system by having its auto-stop relay operate with blank tape in the transmitter.

The above arrangement comprises one of the main features of this invention and the circuits by which it is accomplished will now be traced and described. It should be kept in mind at this point that the auto-stop operation causes the associated tape transmitter to function in the same manner as if blank tape were being stepped.

Assume that transmitter T3 is operating and in this case relays 109, 127 and 218 will be operated and relays 217 and 222 unoperated. Now as the brush 36 contacts segments 4, 5 and 6 of ring 26, a circuit is completed over conductor 264 through the tongue 265 and make contact of relay 127, over conductor 241, through the break contact and tongue 242 of relay 232, over conductor 243 through the break contact and tongue 244 of relay 217 over conductor 247 through the tongue 248 and break contact of relay 249, over conductor 251, through both coils of the auto-stop relay 252 and through the stepping magnet 226 to ground, causing the magnet to step the tape. If the auto-stop contact 254 should be open, as caused by the last stepping impulse from segments 4, 5 and 6 of ring 26 advancing the tape, the next impulse therefrom will cause the operation of relay 252. Relay 252 in operating blocks out further stepping impulses to the stepping magnet 226 while the auto-stop contact 254 remains open and also opens the described circuits involved in switching to any of the other transmitters. This, of course, is a desirable feature when only part of a quotation has been transmitted as it prevents switching in the midst of a quotation. However, the opening of the switching circuits by relay 252 with blank tape in the transmitter is undesirable and relay 371 prevents this as will be hereinafter described. If blanks should be stepped into the transmitter and the auto-stop contact not closed, a switch to another transmitter could be made as described provided another transmitter was at the time waiting to send. The number of blanks separating the quotations in a tape when the transmitter is to be halted for a considerable length of time are enough to insure that one or more blanks will be stepped through the transmitter before the auto-stop relay operates. This prevents the auto-stop contact from being opened on the first blank to appear in the tape while waiting an indefinite length of time for more combinations to be prepared in the tape. Assume that the hereinbefore described impulse from segments 4, 5 and 6 of ring 26 stepped a blank into the transmitter T3. This causes the selecting relays 84 to 89 to return to normal. Now, when the brush 37 subsequently contacts segments 1, 2 and 3 of ring 28, a circuit will be completed therefrom over conductor 124, through the make contact and tongue 234 of relay 127 over conductor 236, through the series arrangements of tongues 237 and break contacts of relays 84 to 89, over conductor 238, through the tongue 239 and make contact of relay 127, over conductor 301, through the make contact and tongue 302 of relay 218, over conductors 303 and 304, through the break contact and tongue 306 of relay 252 over conductors 307 and 308, through the tongue 309 and break contact of relay 157, over conductor 311, through the tongue 312 and break contact of relay 98, over conductor 313, through the make contact and tongue 314 of relay 127, over conductor 316, through the key 293, over conductor 317, through the tongue 376 and break contact of relay 296, over conductor 377, through the break contact and tongue 378 of relay 339, over conductor 379 through the make-before-break contact 381 of relay 371, through the coil of relay 371, over conductor 382 and through the series arrangements of tongue 383 and break contacts of relays 84 to 88 to ground. This causes the energization of relay 371 and it is locked in its operated position by battery from the break contact and tongue 386 of relay 131 over conductor 384 through the tongue 387 associated with the make-before-break contact 381 and over the described circuit to ground. As relay 371 operates, its tongue 373 shorts out the section of the described switching circuit between the make contact and tongue 239 of relay 127 and the tongue 309 of relay 157. The section shorted out contains the circuits through the tongues 302 and 306 and contacts of relays 218 and 252 respectively. Thus, when relay 371 operates, relay 252 can be operated without tying up the circuits, and as soon as any other transmitter calls for the circuits, a switch will be immediately made thereto.

If the auto-stop contact 254 of transmitter T3 closes and allows subsequent stepping impulses to advance the tape to bring a perforated character over the pins before the circuits are switched to another transmitter one or more of the relays 84 to 89 will operate and break the series circuit through their tongue 383 and make contacts. This removes the ground from the relay 371 whereupon it will return to normal and again connect the contacts and tongues of relay 252 into their respective circuits. If the circuit has been taken from transmitter T3 by one of the metallic storing transmitters T1 or T2 while relay 371 was operated, its locking circuit would have been broken by the tongue 386 of relay 131 which also controls the locking circuit to relay 109. Relay 131 is operated as described when a switch is made from the tape transmitting channel to a storing transmitter. In case the switch has been made to transmitter T4, the series circuit through the tongues 383 of relays 84 to 88 would be broken by the operation of these relays which at this time would be transferred too and under the control of transmitter T4. Thus, it can be seen that relay 371 will be returned to normal at the moment combinations appear over the pins of the tape transmitter in control at the time it is operated, or in case one of the other transmitters takes control of the circuits while it is operated.

When a transfer is made to transmitter T4 from transmitter T3, it is necessary to operate relay 232 to block out the first stepping impulse. It will be remembered that relay 232 operated from an impulse passing through a series arrangement of the tongue 323 of relays 84 to 88, and was blocked out by an auto-stop relay. This circuit is also blocked out by relay 371 so that relay 232 can be operated in case a transfer is made to the other tape transmitter. In this case the tongue 372 of relay 371 shorts out the section of the above mentioned circuit between the make contacts associated with the tongues 331 and 388 of relays 258 and 249 and the coil of relay 232. The section of the circuit shorted out comprises the tongues 333 and 336 of relay 261 and 252 respectively.

Relay 371 operates in the same manner to perform the same functions when transmitter T4 is in control of the circuits. Assuming transmitter T4 to be operating, then relay 217 is operated and relay 218 unoperated, and it can be readily seen that the tongue 373 of relay 371 shorts out the switching circuit from the point where it leaves the tongue 239 and make contact of relay 127 to the tongue 309 of relay 157, thus permitting switching to take place on blank tape when the auto-stop relay 261 is operated.

Summary

From the above description it is evident that transmitter T1 is first in order of selection. With this transmitter transmitting, transmitter T2 is automatically given a chance to transmit at the first blank transfer combination transmitted by transmitter T1. If at this time transmitter T2 is void of stored combinations, transmitter T3 is given a chance to transmit and if it too is void of stored combinations, transmitter T4 is automatically given a chance to transmit. With transmitter T2 transmitting, transmitter T1 is automatically given a chance to transmit at the first blank transfer combination transmitted by transmitter T2. If at this time transmitter T1 has no stored combinations, transmitter T3 will be given a chance to transmit and if it also has no stored combinations, transmitter T4 is given a chance to transmit. With transmitter T3 operating, transmitters T1 and T2 are given a chance to operate, in the order named, at the first blank transfer character transmitted by transmitter T3. If, at this time, both transmitters T1 and T2 are void of stored combinations, the manual operation of the key 293 allows transmitter T4 to operate. With transmitter T4 operating, transmitters T1 and T2, in the order named, are given a chance to transmit at the next blank transfer combination transmitted by transmitter T4 and if both of these transmitters are void of stored combination, the manual operation of the key 293 allows transmitter T3 to transmit. Thus it is evident that the order of selection of the transmitters is T1, T2, T3 and T4 in the order named.

It will be noted that all the switching circuits involved in transferring from one transmitter to another always pass through tongues and contacts of a relay or relays which indicate that there are combinations stored in the transmitter to which the transfer is made. Under no conditions can a transfer be made without there first being combinations present to send. If all the transmitters are void of combinations, the circuits will remain connected to the last transmitter to have operated, and will be immediately switched to the next transmitter to call for them. Thus it can be readily seen that a transfer combination or blank is only effective when there is another transmitter ready to transmit.

As is well known in the art, both types of transmitters, the tape and the metallic, are each usually operatively connected with the circuits with which they operate by means of spring clips. When the transmitters are in place the circuits from and to the transmitters are completed through the spring clips. This feature enables the transmitters to be readily removable for repairs, adjustments or replacements. On the removal of a transmitter from the system, the circuits to its associated selecting magnets is broken. If, at the time the transmitter happens to have a code combination therein other than a blank, one or more of the selector magnets will be operated and the removal of the transmitter opens the circuits which causes the selector magnets to return to normal, which is the condition with a blank combination therein. If a transmitter happens to be transmitting at the time of removal, the system then functions in the same manner as if a blank code combination had been transmitted by this transmitter. Thereafter, the system functions in the same manner as it would with the removed transmitter in place and a blank code combination therein. Thus, it is apparent that one or more of the transmitters may be removed from the system without affecting the operability of the system regardless of the operating or non-operating condition of the removed transmitter or transmitters, and this feature comprises another of the novel features of the invention.

*Signal lamps*

A series of four signal lamps 389 to 392, one associated with each of the transmitters T1 to T4 respectively, are provided which indicate, when lighted, which transmitter is connected to the sending circuits. The storing transmitters T1 and T2 are each provided with an additional lamp 393 and 394 which indicate, when lighted, that there are combinations stored in their respective drums.

From the above description it will be remembered that the following conditions exist when the various transmitters are sending to the line; relay 113 is unoperated when transmitter T1 is sending and operated when transmitter T2 is sending, relay 127 is unoperated when one of the storing transmitters T1 or T2 is sending and operated when the tape transmitting channel is in control of the circuits, relay 218 is operated when transmitter T3 is sending, relay 217 is operated when transmitter T4 is sending and relays 98 and 157 are operated when their associated transmitters T1 and T2 respectively have combinations to send. The above mentioned six relays 98, 113, 127, 157, 217 and 218 control the signal lamps as will be herein after described.

One side of each signal lamp 389 to 394 is connected to positive potential. The other sides of the transmitting indicating lamps 389 and 390 of transmitters T1 and T2 respectively are connected by conductors 396 and 397 to the break and make contacts respectively of the tongue 398 of relay 113. The tongue 398 is connected by conductor 399 to the break contact of the grounded tongue 401 of relay 127. The make contact of tongue 401 is connected by conductor 402 in parallel to the break contacts associated with tongues 403 and 404 of relays 217 and 218 respectively. The tongues 403 and 404 are connected by individual conductors of cable 213 to the transmitting signal lamps 391 and 392 of transmitters T3 and T4 respectively. The storage signal lamps 393 and 394 of transmitters T1 and T2 are connected by conductors 406 and 407 to the tongues 408 and 409 of relays 98 and 157 respectively, the make contacts of which are grounded.

As relay 127 is unoperated when a storing transmitter T1 or T2 is sending and relay 113 is unoperated and operated when transmitters T1 and T2 respectively are sending, it is evident that a circuit will be completed from ground at the tongue 401 of relay 127 to the transmitting signal lamp 389 or 390 of the transmitting transmitter T1 or T2. Likewise, as relay 127 is operated when the tape transmitting channel is in control of the sending circuit and relays 217 and 218 are unoperated when their respective tape transmitters T3 and T4 are transmitting, it will be evident that a circuit will be completed from the ground at the tongue 401 of relay 127 to the transmitting signal lamp 391 or 392 of the transmitting transmitter T3 or T4. Thus one and only one of the transmitting signal lamps 389 to 392 will be lighted at one time and indicates which of the associated transmitters is connected to the sending circuits. One of the lamps 389 to 392 may be lighted although its associated transmitter is not transmitting and this condition indicates that none of the transmitters have combinations to send and the circuits remain connected to the last transmitter to send, as it is still connected to the sending circuits.

Relays 98 and 157, when operated, indicate that combinations are stored in their respective transmitters T1 and T2 and when either or both of these relays are operated, a circuit or circuits are completed from the grounded make contacts of tongues 408 and 409 to the storage signal lamps 393 and 394. Thus with combinations stored in one or both of the transmitters T1 and T2, their associated signal storage lamps 393 and 394 will be lighted.

It is obvious, of course, that various modifications of the circuits shown herein may be made without departing from the spirit or essential attributes of the invention, and therefore it is not desired to be limited to the specific details shown and described, except in conformity with the appended claims. For example, the types of storing, transmitting and switching units, and the number and relationship of the transmitters may be varied. Also, the use of other means than blank characters in the storage units to initiate the transfer from one transmitter to another is contemplated.

What is claimed is:

1. In a telegraph system, a rotary distributor, a plurality of automatic transmitters, means for connecting said transmitters one at a time to said distributor, an auto-stop mechanism associated with each transmitter for starting and stopping its associated transmitter, means for reading a code combination set up in said transmitter and means cooperating with said code reading means and operative on the stopping of the transmitter connected to said distributor by its auto-stop mechanism with a predetermined code representation in said transmitter, for connecting another of said transmitters to said distributor if one or more of said other transmitters are operative.

2. In a telegraph system, a rotary distributor, a plurality of automatic transmitters, said transmitters being divided into preferred and deferred groups, means for connecting said transmitters one at a time to said distributor, means operative on the transmission of a predetermined code representation by a preferred transmitter connected to said distributor for connecting another of said preferred transmitters to said distributor if one or more of said preferred transmitters are operative and means to connect one of said deferred transmitters to said distributor when none of said preferred transmitters are operative and one or more of said deferred transmitters are operative.

3. In a telegraph system, a plurality of sources of permutation code intelligence signals, a switching means for associating said source of signals, one at a time, with a common line to effect transmission of signals over the line, means including said switching means operative on the transmission of a non-intelligence permutation code signal by said associated source for partially conditioning the change to another of said source of signals and means for indicating, remote from said sources, which of said sources is associated with said line.

4. In a telegraph system, a plurality of permutation code intelligence storage units, a distributor, means for associating said storage units, one at a time, with said distributor, means for indicating which of said storage units is associated with said distributor and means for indicating storage in predetermined of said storage units.

5. In a telegraph system, a distributor, a plurality of automatic transmitters, said transmitters adapted to transmit stored groups of associated intelligence permutation code signals, said groups of intelligence signals being separated by non-intelligence signals, means for associating said transmitters, one at a time, with said distributor to effect the transmission of said associated stored signals and means to concomitantly effect the advancement of said non-intelligence signals through said disassociated transmitters.

6. In a telegraph system, a plurality of transmitters, means for associating stored permutation code signals with said transmitters, means for disseminating said stored signals from said transmitters in a predetermined preferential order and means whereby said last named means is operative independently of the order in which said signals are stored.

7. In a telegraph system, a line, a distributor for transmitting code combinations of impulses to said line, each combination being preceded by a start impulse and followed by a rest impulse, a plurality of transmitters, means for associating said transmitters, one at a time, with said distributor to effect transmission therefrom, an auto-stop mechanism associated with each transmitter for starting and stopping transmission therefrom, and means operative on the stopping of the transmitter transmitting by its associated auto-stop mechanism with any one of a plurality of predetermined character representations therein for causing said distributor to transmit a prolonged rest impulse, said rest impulse continuing until said auto-stop mechanism allows its transmitter to start.

8. In a telegraph system, a line, a distributor for transmitting code combinations of impulses to said line, each combination being preceded by a start impulse and followed by a rest impulse, a plurality of transmitters, means for associating said transmitters, one at a time, with said distributor to effect transmission therefrom, an auto-stop mechanism associated with each transmitter for starting and stopping transmission therefrom, means operative on the stopping of the transmitting transmitter by its associated auto-stop mechanism with predetermined character representations therein for causing said distributor to transmit a prolonged rest impulse, said rest impulse continuing until said auto-stop mechanism allows its transmitter to start, and means operative when said transmitter is so stopped with other predetermined character representations therein for partially conditioning the association of one of said other transmitters with said distributor.

9. In a telegraph system, a preferred storage transmitter, a plurality of secondary storage transmitters, means for invariably transmitting from said preferred transmitter over a line on the existence of a supply of signals stored therefor and means for transmitting from one at a time of said secondary transmitters whenever said preferred transmitter is idle.

10. In a telegraph system, a sending line, a plurality of transmitters, means for associating said transmitters, one at a time, with said line to transmit code signals thereover, and means controlled by the signals transmitted from the transmitter associated with said line for associating another of said transmitters with said line when another of said transmitters are operative.

11. In a telegraph system, a plurality of preferred storage transmitters, a plurality of secondary storage transmitters, means for invariably transmitting from said preferred transmitters and in a predetermined order when a supply of stored signals therefor exists, means for transmitting from a secondary transmitter whenever said preferred transmitters are idle and means manually controlled for determining the order of selection of said secondary transmitters.

12. In a telegraph system, means for disseminating a plurality of telegraph services comprising code groups of signals over a single channel, automatic means whereby predetermined of said services have preference to said channel over the other of said services, and means whereby a change from one service to another can be made only when following an idle condition of said channel, said idle condition being at least the length of a complete code group.

13. In a telegraph system, a sending line, a plurality of signal storage units adapted to have character signals stored therein, said character signals being separated by transfer signals interposed therebetween, means for associating said storage units, one at a time, with said line to effect the transmission to said line of signals stored therein and means on the transmission of a transfer signal for partially conditioning the association of another of said storage units with said line.

14. In a telegraph system, a sending channel, a plurality of automatic transmitters adapted to control said channel, one at a time, an auto-stop mechanism for stopping and starting each transmitter, means for transferring the control of said channel from one to another of said transmitters in a predetermined order and means for preventing a transfer during the transmission of a natural sequence of signals, irrespective of the operation of said auto-stop mechanism.

15. In a communication system a distributor, a plurality of transmitters, means for operatively associating said transmitters one at a time with said distributor to effect transmission of signals stored therein and automatic electrically controlled means whereby one or more of said transmitters may be removed from said system without affecting the operativeness of the system regardless of the operating or non-operating condition of the transmitter or transmitters removed.

16. In a communication system, a sending channel, a plurality of transmitters, means for operatively associating said transmitters one at a time and in a predetermined order of selection with said sending channel, means whereby one or more of said transmitters may be removed from said system without affecting the operativeness of the system and means operable on the removal of one or more of said transmitters whereupon the order of selection of those of said remaining transmitters, if any, ahead of said removed transmitter or transmitters is not changed and the order of selection of those of said remaining transmitters, if any, ordinarily selected after said removed transmitter or transmitters are advanced.

17. In a communication system, a first preferred storage transmitter, a second preferred storage transmitter, a plurality of other storage transmitters, means for invariably transmitting from said first preferred transmitter over a line on the existence of a supply of signals stored therefor, means for invariably transmitting from said second preferred transmitter on the existence of a supply of signals stored therefor whenever said first preferred transmitter is idle, means for transmitting from one of said other storage transmitters whenever both of said first and second preferred transmitters are idle, means for removing any one or more of said transmitters from said system without affecting the operativeness thereof, and means operative on the removal of one or more of said transmitters whereby the remaining of said transmitters in said system function as if said removed transmitter or transmitters were idle.

18. In a communication system a first preferred storage transmitter, a second preferred storage transmitter, a plurality of other storage transmitter, means for invariably transmitting from said first preferred transmitter over a line on the existence of a supply of signals stored therefor, means for invariably transmitting from said second preferred transmitter on the existence of a supply of signals stored therefor whenever said first preferred transmitter is idle, means for transmitting from one of said other storage transmitters whenever both of said first and second preferred transmitters are idle, and means for transmitting a uniform impulse of variable length on the transfer from any one of said transmitters to another.

19. In a telegraph system, a distributor, a plurality of automatic transmitters, said transmitters being adapted to transmit stored groups of associated intelligence permutation code signals, said groups of intelligence signals being separated by non-intelligence signals, means for associating said transmitters one at a time with said distributor to effect the transmission of said associated stored intelligence signals, means for concomitantly effecting the advancement of non-intelligence signals though one or more of said disassociated transmitters and means to halt the advancement of signals through one or more of said disassociated transmitters on the occurrence of an intelligence signal in the associated transmitter.

20. In a telegraph system, a distributor, a plurality of automatic transmitters, said transmitters being adapted to transmit stored groups of associated intelligence permutation code signals, said groups of intelligence signals being separated by non-intelligence signals, means for associating said transmitters one at a time with said distributor to effect the transmission of said associated stored intelligence signals, means for concomitantly effecting the advancement of non-intelligence signals through one or more of said disassociated transmitters, means to halt the advancement of signals through one or more of said disassociated transmitters on the occurrence of an intelligence signal in the associated transmitter, and means to associate those of said disassociated transmitters thus halted, one at a time, with said distributor in a predetermined order regardless of the order of halting said disassociated transmitters.

21. In a communication system, a distributor, a plurality of automatic transmitters, means for operatively associating said transmitters one at a time and in a predetermined order with said distributor to effect selective operation thereof and manually operable means to change said predetermined order of association.

22. In a telegraph system, a distributing means, a plurality of transmitting means, a switching means for operatively associating each of said transmitting means one at a time with said distributing means, means for determining the condition of each of said transmitting means and means dependent on the condition of said transmitting means and responsive to a predetermined code combination of impulses transmitted by the particular transmitting means transmitting, for rendering said switching means operable.

23. In a telegraph system, a distributing means, a plurality of transmitting means, a switching means for operatively associating each of said transmitting means one at a time with said distributing means, and means jointly responsive to a predetermined code combination of impulses transmitted by the transmitter means transmitting, and a code combination other than said predetermined combination in any one or all of predetermined of said other transmitting means to operate said switching means to operatively associate one of said predetermined other transmitting means with said distributing means.

24. In a telegraph system, a distributing means, a plurality of transmitting means, a switching means for operatively associating each of said transmitting means one at a time with said distributing means, and means jointly responsive to a predetermined code combination of impulses transmitted by the transmitter means transmitting, and a code combination other than said predetermined combination in any one or all of predetermined of said other transmitting means to operate said switching means to operatively associate one of said predetermined other transmitting means with said distributing means and means operative when more than one of said other transmitting means have combinations therein, other than said predetermined combination, whereby said last mentioned transmitting means are operatively associated with said switching means in a predetermined order.

25. In a telegraph system, a distributing means, a plurality of more than two code transmitting means, a direct non-seeking switching means responsive to code combinations of impulses transmitted through said distributing means for directly and automatically switching the control of said distributing means from one of said transmitting means to another.

26. In combination, a distributor, a plurality of transmitters, a switching means for operatively associating said transmitters one at a time with said distributor, an auto-stop mechanism associated with each transmitter for starting and stopping the same, and means whereby the operation of the auto-stop mechanism of any one or more of the transmitters disassociated from said distributor with a predetermined code combination therein, prevents said switching means from operatively associating any one of such transmitters with said distributor.

27. In combination, a distributor, a plurality of transmitters, a switching means for operatively associating said transmitters one at a time with said distributor, an auto-stop mechanism associated with each transmitter for starting and stopping the same, means whereby the operation of the auto-stop mechanism of any one or more of the transmitters disassociated from said distributor with a predetermined code combination therein, prevents said switching means from operatively associating any one of such transmitters with said distributor and means operative with any other than said predetermined code combination in said transmitters regardless of the condition of their auto-stop mechanism for conditioning said switching means for operation.

28. In combination in a communication system, a distributing means, a plurality of transmitting means, each of said transmitting means adapted to be rendered operable by having code combinations to transmit, transfer means for operatively associating each of said transmitting means, one at a time, with said distributing means and means operative with predetermined of said transmitting means associated with said distributing means and the transmission of a predetermined code combination therethrough for allowing said transfer means to operatively associate any one of said other transmitting means with said distributing means.

29. In combination in a communication system, a distributing means, a plurality of transmitting means, each of said transmitting means adapted to be rendered operable by having code combinations to transmit, transfer means for operatively associating each of said transmitting means, one at a time, with said distributing means and means operative with predetermined of said transmitting means associated with said distributing means and the transmission of a predetermined code combination therethrough for allowing said transfer means to operatively associate any one of a predetermined number of said other transmitting means with said distributing means.

30. In combination in a communication system, a distributing means, a plurality of transmitting means, each of said transmitting means adapted to be rendered operable by having code combinations to transmit, transfer means for operatively associating each of said transmitting means, one at a time, with said distributing means, means operative with predetermined of said transmitting means associated with said distributing means and the transmission of a predetermined code combination therethrough for allowing said transfer means to operatively associate any one of said other transmitting means with said distributing means, and means operable when more than one of said other transmitting means are operable, whereby said transfer means selectively determines which one of said other transmitting means is operatively associated with said distributing means.

31. In combination in a communication system, a distributing means, a plurality of transmitting means, each of said transmitting means adapted to be rendered operable by having code combinations to transmit, transfer means for operatively associating each of said transmitting means, one at a time, with said distributing means, means operative with predetermined of said transmitting means associated with said distributing means and the transmission of a predetermined code combination therethrough for allowing said transfer means to operatively associate any one of said other transmitting means with said distributing means, means operable when more than one of said other transmitting means are operable, whereby said transfer means selectively determines which one of said other transmitting means is operatively associated with said distributing means, and means whereby said transfer means is allowed to reassociate said predetermined transmitting means with said distributing means on the transmission of said predetermined code combination by the associated one of said other transmitting means.

32. In combination in a communication system, a distributing means, a plurality of transmitting means, each of said transmitting means adapted to be rendered operable by having code combinations to transmit, transfer means for operatively associating each of said transmitting means, one at a time, with said distributing means, means operative with predetermined of said transmitting means associated with said distributing means and the transmission of a predetermined code combination therethrough for allowing said transfer means to operatively associate any one of said other transmitting means with said distributing means, means operable when more than one of said other transmitting means are operable, whereby said transfer means selectively determines which one of said other transmitting means is operatively associated with said distributing means, means whereby said transfer means is allowed to reassociate said predetermined transmitting means with said distributing means on the transmission of said predetermined code combination by the associated one of said other transmitting means and means whereby with said predetermined transmitting means inoperative said transfer means is allowed to operatively associate another of said other transmitting means with said distributing means.

33. In a telegraph system, a rotary distributor, a plurality of automatic transmitters, means for connecting said transmitters one at a time to said distributor, an auto-stop mechanism associated with each transmitter for starting and stopping its associated transmitter, means for reading a code combination set up in said transmitter and means cooperating with said code reading means and operative on the stopping of the transmitter connected to said distributor by its auto-stop mechanism with a predetermined code representation in said transmitter, for connecting another of said transmitters to said distributor when one or more of said other transmitters are operative.

34. In a telegraph system, a sending line, a plurality of transmitter, a distributor common to said transmitters, means for associating said transmitters, one at a time, with said distributor to transmit code signals over the line, and means controlled by the signals transmitted from the transmitter associated with said distributor for associating another of said transmitters with said distributor if another of said transmitters is operative.

35. In a communication system, a distributor, a plurality of automatic transmitters, means for operatively associating said transmitters one at a time and in a predetermined order with said distributor to effect selective operation thereof, manually operable means to change said predetermined order of association, and means for automatically returning the order of association of said transmitters with said distributor to said predetermined order after a cycle of association in said changed order of association.

36. In a telegraph system, a rotary distributor, a plurality of automatic transmitters, said transmitters being divided into preferred and deferred groups, means for connecting one of said transmitters at a time to said distributor, means whereby said preferred transmitters have preference to said distributor over said deferred transmitters, and means for connecting any one of said deferred transmitters to said distributor when all of said preferred transmitters are inoperative.

37. In a telegraph system, a distributor, a primary group of transmitters, a secondary group of transmitters, means including electrically actuated devices whereby each of said transmitters is adapted to be rendered operable by having stored permutation code combinations to transmit, means for associating each of said transmitters, one at a time, with said distributor and means whereby each operative transmitter of said primary group is associated with said distributor before any transmitter of said secondary group.

38. In a telegraph system, a distributor, a plurality of automatic transmitters, means including electrical circuits whereby each of said transmitters on assocation with said distributor is adapted to transmit associated stored permutation code combinations of impulses, a control means whereby said transmitters are associated with said distributor, one at a time, in a predetermined preferential order and means for retaining the last operating transmitter associated with said distributor.

39. In a telegraph system, a plurality of transmitters, a rotary distributor having a cycle of operation in which a permutation code group of signals is normally transmitted from one of said transmitters and an operating impulse supplied to one or more of said transmitters, means for transferring from one to another of said transmitters and means for blocking out said transmitter operating impulse to predetermined of said transmitters for a single cycle of operation of said distributor when transferring from one to another of said transmitters.

40. In a telegraph system, a first preferred storage transmitter, a second preferred storage transmitter, a plurality of other storage transmitters, means for invariably transmitting from said first preferred transmitter over a line on the existence of a supply of signals stored therefor, means for invariably transmitting from said second preferred transmitter on the existence of a supply of signals stored therefor whenever said first preferred transmitter is idle and means for transmitting from one of said other storage transmitters whenever both of said first and second preferred transmitters are idle.

41. The combination as set forth in claim 40 wherein said means are fully automatic and electrically operated.

42. In a telegraph system, a plurality of types of automatic storage transmitters, means for normally transmitting from a predetermined one of said transmitters over a line and automatic means controlled by signals stored for transmission in another of said transmitters for effecting transmission therefrom whenever said predetermined transmitter becomes idle.

43. In a telegraph system, a plurality of preferred storage transmitters, a plurality of secondary storage transmitters, means for invariably transmitting from said preferred transmitters and in a predetermined order when a supply of stored signals therefor exists, means for transmitting from a secondary transmitter whenever said preferred transmitters are idle and manually controlled means operable prior to the transmission from said secondary transmitter for determining the order of operation thereof.

44. In a telegraph system, means for disseminating a plurality of telegraph services over a single channel and automatic means whereby predetermined of said services have preference to said channel over the other of said services, and means whereby a change from each of said services to another can be made only at predetermined times in each of said services.

45. In a communication system, a distributor, a plurality of transmitters, means for operatively associating said transmitters one at a time with said distributor to effect transmission of signals stored therein, means whereby one or more of said transmitters may be removed from said system without affecting the operativeness of the system regardless of the operating or non-operating condition of the transmitter or transmitters removed, and means whereby said removed transmitter may be replaced without affecting the operativeness of the system at the time of replacement.

46. In a communication system, a distributor, a plurality of storage transmitters, a switching means for operatively associating each of said transmitters one at a time with said distributor to effect the transmission of character code signals therefrom, means operative on the transmission of a predetermined character code by the transmitter transmitting to prepare said switching means for operation and means operative on the next character code transmitted by said transmitter to operate said switching means to connect another of said transmitters to said distributor if one or more of said transmitters are operative.

47. In a communication system, a distributor, a plurality of storage transmitting means, a transfer means for operatively associating each of said transmitting means, one at a time with said distributor to effect the transmission of intelligence and non-intelligence character codes stored therefor and concomitantly advancing non-intelligence character codes through said disassociated transmitting means, means for halting the advancement of character codes through said disassociated transmitting means on the appearance of an intelligence character code therein, means for conditioning said transfer means for operation on the occurrence of a non-intelligence character code in said associated transmitter if none of said disassociated transmitting means are halted and means for operating said transfer means if one or more of said disassociated transmitting means are halted with an intelligence character code therein.

48. In combination, a distributor, a plurality of transmitters, a switching means for operatively associating said transmitters one at a time with said distributor, an auto-stop mechanism associated with each transmitter for starting and stopping the same, and means whereby the operation of the auto-stop mechanism of the transmitter associated with the distributor, with any other than a predetermined code combination therein, prevents the operation of said switching means, and means operative with said predetermined code combination in said transmitter, regardless of the condition of its auto-stop mechanism, for conditioning said switching means for operation.

49. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters and means operative with said first transmitter associated with said distributing means whereby the transmission of a predetermined code combination thereby will operate said second mentioned means to operatively associate any one of said other transmitters having code combinations stored therein with said distributing means.

50. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters and means operative with said second transmitter associated with said distributor whereby the transmission of a predetermined code combination thereby operates said second mentioned means to operatively associate any one of said other transmitters having code combinations stored therein with said distributing means.

51. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters and means operative with said third transmitter associated with said distributor whereby the transmission of a predetermined code combination thereby automatically operates said second mentioned means to operatively associate either said first or second transmitter having code combinations stored therein with said distributing means.

52. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters and means operative with said third transmitter associated with said distributor whereby the transmission of a predetermined code combination thereby automatically operates said second mentioned means to operatively associate either said first or second transmitter having code combinations stored within with said distributing means, and means manually operable preceding or following the transmission of said predetermined code combination whereby said second mentioned means operates to transfer the control of said distributing means to said fourth transmitter if operative on the transmission of said predetermined code combination by said third transmitter.

53. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters and means operative with said fourth transmitter associated with said distributor whereby the transmission of a predetermined code combination thereby automatically operates said second mentioned means to operatively associate either said first or second transmitter being operative with said distributing means.

54. In a communication system, a distributing means, a first transmitter, a second transmitter, a third transmitter and a fourth transmitter, means for rendering each of said transmitters operative by having code combinations stored therein, means for operatively associating each of said transmitters, one at a time, with said distributing means to effect selective operation of said transmitters, means operative with said fourth transmitter associated with said distributor whereby the transmission of a predetermined code combination thereby automatically operates said second mentioned means to operatively associate either said first or second transmitter having code combinations stored therein with said distributing means, and means manually operable preceding or following the transmission of said predetermined code combination whereby said second mentioned means operates to transfer the control of said distributing means to said third transmitter if operative on the transmission of said predetermined code combination by said fourth transmitter.

55. In a telegraph system, a sending channel, a plurality of transmitters adapted to control said channel, one at a time, means for transferring the control of said channel from one to another of said transmitters, signal controlled means for controlling the operation of said transferring means and means for selectively operating said signal controlled means by each transmitter in response to a predetermined signal when said transmitter has control of said channel.

JAMES N. ANDERSON.
ROBERT F. DIRKES.